(12) United States Patent
Hira et al.

(10) Patent No.: US 12,074,731 B2
(45) Date of Patent: *Aug. 27, 2024

(54) TRANSITIVE ROUTING IN PUBLIC CLOUD

(71) Applicant: VMware LLC, Palo Alto, CA (US)

(72) Inventors: Mukesh Hira, Palo Alto, CA (US); Su Wang, Sunnyvale, CA (US); Rahul Jain, Sunnyvale, CA (US); Ganesan Chandrashekhar, Campbell, CA (US); Sandeep Siroya, Santa Clara, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,669

(22) Filed: Jun. 26, 2022

(65) Prior Publication Data

US 2022/0329461 A1    Oct. 13, 2022

Related U.S. Application Data

(63) Continuation of application No. 16/112,597, filed on Aug. 24, 2018, now Pat. No. 11,374,794.

(51) Int. Cl.
*H04L 12/66* (2006.01)
*H04L 12/46* (2006.01)
(Continued)

(52) U.S. Cl.
CPC .......... *H04L 12/66* (2013.01); *H04L 12/4633* (2013.01); *H04L 45/72* (2013.01); *H04L 45/74* (2013.01); *H04L 67/10* (2013.01)

(58) Field of Classification Search
CPC ..... H04L 12/4633; H04L 12/66; H04L 45/72; H04L 45/74; H04L 67/10; H04L 45/306; H04L 45/64
See application file for complete search history.

(56) References Cited

U.S. PATENT DOCUMENTS 6,108,300 A    8/2000  Coile et al.
6,832,238 B1  12/2004  Sharma et al.
(Continued)

FOREIGN PATENT DOCUMENTS

CN    1792062 A    6/2006
CN  101764752 A    6/2010
(Continued)

OTHER PUBLICATIONS

Author Unknown, "Network Controller," Dec. 16, 2014, 4 pages, available at: https://web.archive.org/web/20150414112014/https://technet.microsoft.com/en-us/library/dn859239.aspx.
(Continued)

*Primary Examiner* — Phuc H Tran
(74) *Attorney, Agent, or Firm* — Quarles & Brady LLP

(57) ABSTRACT

Some embodiments provide a centralized overlay-network cloud gateway and a set of centralized services in a transit virtual cloud network (VCN) connected to multiple other compute VCNs hosting compute nodes (VMs, containers, etc.) that are part of (belong to) the overlay network. The centralized overlay-network cloud gateway provides connectivity between compute nodes of the overlay network (e.g., a logical network spanning multiple VCNs) and compute nodes in external networks. Some embodiments use the centralized overlay-network cloud gateway to provide transitive routing (e.g., routing through a transit VCN) in the absence of direct peering between source and destination VCNs. The overlay network, of some embodiments, uses the same subnetting and default gateway address for each compute node as the cloud provider network provided by the virtual private cloud provider.

17 Claims, 9 Drawing Sheets

(51) Int. Cl.
   *H04L 45/00*     (2022.01)
   *H04L 45/74*     (2022.01)
   *H04L 67/10*     (2022.01)

(56) References Cited

U.S. PATENT DOCUMENTS

| | | |
|---|---|---|
| 7,107,360 B1 | 9/2006 | Phadnis et al. |
| 7,360,245 B1 | 4/2008 | Ramachandran et al. |
| 7,423,962 B2 | 9/2008 | Auterinen |
| 7,523,485 B1 | 4/2009 | Kwan |
| 7,953,895 B1 | 5/2011 | Narayanaswamy et al. |
| 8,264,947 B1 | 9/2012 | Tavares |
| 8,296,434 B1 | 10/2012 | Miller et al. |
| 8,432,791 B1 | 4/2013 | Masters |
| 8,514,868 B2 | 8/2013 | Hill |
| 8,719,590 B1 | 5/2014 | Faibish et al. |
| 8,738,745 B1 | 5/2014 | Brandwine et al. |
| 8,902,743 B2 | 12/2014 | Greenberg et al. |
| 8,958,293 B1 | 2/2015 | Anderson |
| 9,135,037 B1 | 9/2015 | Petrescu-Prahova et al. |
| 9,137,209 B1 | 9/2015 | Brandwine et al. |
| 9,244,669 B2 | 1/2016 | Govindaraju et al. |
| 9,276,897 B2* | 3/2016 | Zhang .............. H04L 41/0803 |
| 9,356,866 B1 | 5/2016 | Sivaramakrishnan et al. |
| 9,413,730 B1 | 8/2016 | Narayan et al. |
| 9,485,149 B1 | 11/2016 | Traina et al. |
| 9,519,782 B2 | 12/2016 | Aziz et al. |
| 9,590,904 B2 | 3/2017 | Heo et al. |
| 9,699,070 B2 | 7/2017 | Davie et al. |
| 9,832,118 B1 | 11/2017 | Miller et al. |
| 9,860,079 B2 | 1/2018 | Cohn et al. |
| 9,860,214 B2 | 1/2018 | Bian et al. |
| 9,871,720 B1 | 1/2018 | Tillotson |
| 10,135,675 B2 | 11/2018 | Yu et al. |
| 10,193,749 B2 | 1/2019 | Hira et al. |
| 10,228,959 B1 | 3/2019 | Anderson et al. |
| 10,326,744 B1* | 6/2019 | Nossik .............. H04L 63/0435 |
| 10,333,959 B2 | 6/2019 | Katrekar et al. |
| 10,341,371 B2 | 7/2019 | Katrekar et al. |
| 10,348,689 B2 | 7/2019 | Bian et al. |
| 10,348,767 B1* | 7/2019 | Lee .................... H04L 63/0236 |
| 10,367,757 B2 | 7/2019 | Chandrashekhar et al. |
| 10,397,136 B2 | 8/2019 | Hira et al. |
| 10,484,302 B2 | 11/2019 | Hira et al. |
| 10,491,466 B1 | 11/2019 | Hira et al. |
| 10,491,516 B2 | 11/2019 | Ram et al. |
| 10,523,514 B2 | 12/2019 | Lee |
| 10,567,482 B2 | 2/2020 | Ram et al. |
| 10,601,705 B2 | 3/2020 | Hira et al. |
| 10,673,952 B1 | 6/2020 | Cohen et al. |
| 10,764,331 B2 | 9/2020 | Hoole et al. |
| 10,778,579 B2 | 9/2020 | Hira |
| 10,805,330 B2 | 10/2020 | Katrekar et al. |
| 10,812,413 B2 | 10/2020 | Chandrashekhar et al. |
| 10,862,753 B2 | 12/2020 | Hira et al. |
| 10,924,431 B2 | 2/2021 | Chandrashekhar et al. |
| 11,018,993 B2 | 5/2021 | Chandrashekhar et al. |
| 11,115,465 B2 | 9/2021 | Ram et al. |
| 11,196,591 B2 | 12/2021 | Hira et al. |
| 11,343,229 B2 | 5/2022 | Jain et al. |
| 11,374,794 B2 | 6/2022 | Hira et al. |
| 11,695,697 B2 | 7/2023 | Hira |
| 2002/0062217 A1 | 5/2002 | Fujimori |
| 2002/0199007 A1 | 12/2002 | Clayton et al. |
| 2007/0186281 A1 | 8/2007 | McAlister |
| 2007/0226795 A1 | 9/2007 | Conti et al. |
| 2007/0256073 A1 | 11/2007 | Troung et al. |
| 2008/0104692 A1 | 5/2008 | McAlister |
| 2008/0225888 A1 | 9/2008 | Valluri et al. |
| 2009/0190549 A1 | 7/2009 | Kim et al. |
| 2009/0254973 A1 | 10/2009 | Kwan |
| 2010/0037311 A1 | 2/2010 | He et al. |
| 2010/0112974 A1 | 5/2010 | Sahai et al. |
| 2010/0257263 A1 | 10/2010 | Casado et al. |
| 2010/0318609 A1 | 12/2010 | Lahiri et al. |
| 2011/0075667 A1 | 3/2011 | Li et al. |
| 2011/0075674 A1 | 3/2011 | Li et al. |
| 2011/0176426 A1 | 7/2011 | Lioy et al. |
| 2011/0209147 A1 | 8/2011 | Box et al. |
| 2011/0317703 A1 | 12/2011 | Dunbar et al. |
| 2012/0072762 A1 | 3/2012 | Atchison et al. |
| 2012/0082063 A1 | 4/2012 | Fujita |
| 2012/0250682 A1 | 10/2012 | Vincent et al. |
| 2013/0036213 A1 | 2/2013 | Hasan et al. |
| 2013/0044636 A1 | 2/2013 | Koponen et al. |
| 2013/0044641 A1 | 2/2013 | Koponen et al. |
| 2013/0044763 A1 | 2/2013 | Koponen et al. |
| 2013/0058208 A1 | 3/2013 | Pfaff et al. |
| 2013/0058335 A1 | 3/2013 | Koponen et al. |
| 2013/0060928 A1 | 3/2013 | Shao |
| 2013/0125230 A1 | 5/2013 | Koponen et al. |
| 2013/0142203 A1 | 6/2013 | Koponen et al. |
| 2013/0152076 A1 | 6/2013 | Patel |
| 2013/0163427 A1 | 6/2013 | Beliveau et al. |
| 2013/0198740 A1 | 8/2013 | Arroyo et al. |
| 2013/0263118 A1 | 10/2013 | Kannan et al. |
| 2013/0287022 A1 | 10/2013 | Banavalikar et al. |
| 2013/0287026 A1 | 10/2013 | Davie |
| 2013/0297768 A1 | 11/2013 | Singh |
| 2013/0304903 A1 | 11/2013 | Mick et al. |
| 2013/0318219 A1 | 11/2013 | Kancherla |
| 2013/0346585 A1 | 12/2013 | Ueno |
| 2014/0010239 A1 | 1/2014 | Xu et al. |
| 2014/0052877 A1 | 2/2014 | Mao |
| 2014/0098813 A1 | 4/2014 | Mishra et al. |
| 2014/0108665 A1 | 4/2014 | Arora et al. |
| 2014/0143853 A1 | 5/2014 | Onodera |
| 2014/0156818 A1 | 6/2014 | Hunt |
| 2014/0192804 A1 | 7/2014 | Ghanwani et al. |
| 2014/0226820 A1 | 8/2014 | Chopra et al. |
| 2014/0241247 A1 | 8/2014 | Kempf et al. |
| 2014/0245420 A1 | 8/2014 | Tidwell et al. |
| 2014/0280488 A1 | 9/2014 | Voit et al. |
| 2014/0280961 A1 | 9/2014 | Martinez et al. |
| 2014/0317677 A1 | 10/2014 | Vaidya et al. |
| 2014/0334495 A1 | 11/2014 | Stubberfield et al. |
| 2014/0337500 A1 | 11/2014 | Lee |
| 2014/0351396 A1 | 11/2014 | Stabile et al. |
| 2014/0376560 A1 | 12/2014 | Senniappan et al. |
| 2015/0009995 A1 | 1/2015 | Gross, IV et al. |
| 2015/0016286 A1 | 1/2015 | Ganichev et al. |
| 2015/0016460 A1 | 1/2015 | Zhang et al. |
| 2015/0043383 A1 | 2/2015 | Farkas et al. |
| 2015/0052522 A1 | 2/2015 | Chanda et al. |
| 2015/0052525 A1 | 2/2015 | Raghu |
| 2015/0063360 A1 | 3/2015 | Thakkar et al. |
| 2015/0063364 A1 | 3/2015 | Thakkar et al. |
| 2015/0085870 A1 | 3/2015 | Narasimha et al. |
| 2015/0096011 A1 | 4/2015 | Watt |
| 2015/0098455 A1 | 4/2015 | Fritsch |
| 2015/0098465 A1 | 4/2015 | Pete et al. |
| 2015/0103838 A1 | 4/2015 | Zhang et al. |
| 2015/0106804 A1 | 4/2015 | Chandrashekhar et al. |
| 2015/0124645 A1 | 5/2015 | Yadav et al. |
| 2015/0128245 A1 | 5/2015 | Brown et al. |
| 2015/0138973 A1 | 5/2015 | Kumar et al. |
| 2015/0139238 A1 | 5/2015 | Pourzandi et al. |
| 2015/0163137 A1 | 6/2015 | Kamble et al. |
| 2015/0163145 A1 | 6/2015 | Pettit et al. |
| 2015/0163192 A1 | 6/2015 | Jain et al. |
| 2015/0172075 A1 | 6/2015 | DeCusatis et al. |
| 2015/0172183 A1 | 6/2015 | DeCusatis et al. |
| 2015/0172331 A1 | 6/2015 | Raman |
| 2015/0188888 A1* | 7/2015 | Kang .................. H04L 63/0272 726/12 |
| 2015/0263899 A1 | 9/2015 | Tubaltsev et al. |
| 2015/0263946 A1 | 9/2015 | Tubaltsev et al. |
| 2015/0263983 A1 | 9/2015 | Brennan et al. |
| 2015/0263992 A1 | 9/2015 | Kuch et al. |
| 2015/0264077 A1 | 9/2015 | Berger et al. |
| 2015/0271303 A1* | 9/2015 | Neginhal .............. H04L 49/70 370/392 |
| 2015/0281098 A1 | 10/2015 | Pettit et al. |
| 2015/0281171 A1 | 10/2015 | Xiao |

(56) References Cited

U.S. PATENT DOCUMENTS

| | | |
|---|---|---|
| 2015/0281274 A1 | 10/2015 | Masurekar et al. |
| 2015/0295731 A1 | 10/2015 | Bagepalli et al. |
| 2015/0295800 A1 | 10/2015 | Bala et al. |
| 2015/0304117 A1 | 10/2015 | Dong et al. |
| 2015/0326469 A1 | 11/2015 | Kern et al. |
| 2015/0339136 A1 | 11/2015 | Suryanarayanan et al. |
| 2015/0350059 A1 | 12/2015 | Chunduri et al. |
| 2015/0350101 A1 | 12/2015 | Sinha et al. |
| 2015/0373012 A1 | 12/2015 | Bartz et al. |
| 2015/0381493 A1 | 12/2015 | Bansal et al. |
| 2016/0014023 A1 | 1/2016 | He et al. |
| 2016/0050117 A1 | 2/2016 | Voellmy et al. |
| 2016/0055019 A1 | 2/2016 | Thakkar et al. |
| 2016/0057005 A1 | 2/2016 | Thakkar et al. |
| 2016/0072888 A1 | 3/2016 | Jung et al. |
| 2016/0094364 A1 | 3/2016 | Subramaniyam et al. |
| 2016/0094661 A1 | 3/2016 | Jain et al. |
| 2016/0105488 A1 | 4/2016 | Thakkar et al. |
| 2016/0124742 A1 | 5/2016 | Rangasamy et al. |
| 2016/0134418 A1 | 5/2016 | Liu et al. |
| 2016/0149796 A1 | 5/2016 | Raman |
| 2016/0182567 A1 | 6/2016 | Sood et al. |
| 2016/0191304 A1 | 6/2016 | Muller |
| 2016/0198003 A1 | 7/2016 | Luft |
| 2016/0212049 A1 | 7/2016 | Davie |
| 2016/0226967 A1 | 8/2016 | Zhang et al. |
| 2016/0274926 A1 | 9/2016 | Narasimhamurthy et al. |
| 2016/0308762 A1 | 10/2016 | Teng et al. |
| 2016/0321664 A1* | 11/2016 | Erickson .............. G06Q 20/409 |
| 2016/0337329 A1 | 11/2016 | Sood et al. |
| 2016/0352623 A1 | 12/2016 | Jayabalan et al. |
| 2016/0352682 A1 | 12/2016 | Chang et al. |
| 2016/0352747 A1 | 12/2016 | Khan et al. |
| 2016/0364575 A1 | 12/2016 | Caporal et al. |
| 2016/0380973 A1 | 12/2016 | Sullenberger et al. |
| 2017/0005923 A1 | 1/2017 | Babakian |
| 2017/0006053 A1 | 1/2017 | Greenberg et al. |
| 2017/0034129 A1 | 2/2017 | Sawant et al. |
| 2017/0034198 A1 | 2/2017 | Powers et al. |
| 2017/0060628 A1 | 3/2017 | Tarasuk-Levin et al. |
| 2017/0078248 A1 | 3/2017 | Bian et al. |
| 2017/0091458 A1 | 3/2017 | Gupta et al. |
| 2017/0091717 A1 | 3/2017 | Chandraghatgi et al. |
| 2017/0093646 A1 | 3/2017 | Chanda et al. |
| 2017/0097841 A1 | 4/2017 | Chang et al. |
| 2017/0099188 A1 | 4/2017 | Chang et al. |
| 2017/0104365 A1 | 4/2017 | Ghosh et al. |
| 2017/0111230 A1 | 4/2017 | Srinivasan et al. |
| 2017/0118115 A1 | 4/2017 | Tsuji |
| 2017/0126552 A1 | 5/2017 | Pfaff et al. |
| 2017/0142012 A1 | 5/2017 | Thakkar et al. |
| 2017/0149582 A1 | 5/2017 | Cohn et al. |
| 2017/0163442 A1 | 6/2017 | Shen et al. |
| 2017/0163599 A1 | 6/2017 | Shen et al. |
| 2017/0195217 A1 | 7/2017 | Parasmal et al. |
| 2017/0195253 A1 | 7/2017 | Annaluru et al. |
| 2017/0214545 A1 | 7/2017 | Cheng et al. |
| 2017/0222928 A1 | 8/2017 | Johnsen et al. |
| 2017/0223518 A1 | 8/2017 | Upadhyaya et al. |
| 2017/0230241 A1 | 8/2017 | Neginhal et al. |
| 2017/0279826 A1 | 9/2017 | Mohanty et al. |
| 2017/0289060 A1 | 10/2017 | Aftab et al. |
| 2017/0302529 A1 | 10/2017 | Agarwal et al. |
| 2017/0302535 A1 | 10/2017 | Lee |
| 2017/0310580 A1 | 10/2017 | Caldwell et al. |
| 2017/0317972 A1 | 11/2017 | Bansal et al. |
| 2017/0324848 A1 | 11/2017 | Johnsen et al. |
| 2017/0331746 A1 | 11/2017 | Qiang |
| 2017/0353351 A1* | 12/2017 | Cheng ................. H04L 12/4625 |
| 2017/0359304 A1 | 12/2017 | Benny et al. |
| 2018/0006943 A1 | 1/2018 | Dubey |
| 2018/0007002 A1* | 1/2018 | Landgraf ................ H04L 12/66 |
| 2018/0013791 A1 | 1/2018 | Healey et al. |
| 2018/0026873 A1 | 1/2018 | Cheng et al. |
| 2018/0026944 A1 | 1/2018 | Phillips |
| 2018/0027012 A1 | 1/2018 | Srinivasan et al. |
| 2018/0027079 A1 | 1/2018 | Ali et al. |
| 2018/0053001 A1 | 2/2018 | Folco et al. |
| 2018/0062880 A1 | 3/2018 | Yu et al. |
| 2018/0062881 A1 | 3/2018 | Chandrashekhar et al. |
| 2018/0062917 A1 | 3/2018 | Chandrashekhar et al. |
| 2018/0062923 A1 | 3/2018 | Katrekar et al. |
| 2018/0062933 A1 | 3/2018 | Hira et al. |
| 2018/0063036 A1 | 3/2018 | Chandrashekhar et al. |
| 2018/0063086 A1 | 3/2018 | Hira et al. |
| 2018/0063087 A1 | 3/2018 | Hira et al. |
| 2018/0063176 A1 | 3/2018 | Katrekar et al. |
| 2018/0063193 A1 | 3/2018 | Chandrashekhar et al. |
| 2018/0077048 A1 | 3/2018 | Kubota et al. |
| 2018/0083923 A1 | 3/2018 | Bian et al. |
| 2018/0115586 A1 | 4/2018 | Chou et al. |
| 2018/0139123 A1 | 5/2018 | Qiang |
| 2018/0197122 A1 | 7/2018 | Kadt et al. |
| 2018/0336158 A1 | 11/2018 | Iyer et al. |
| 2019/0037033 A1 | 1/2019 | Khakimov et al. |
| 2019/0068493 A1 | 2/2019 | Ram et al. |
| 2019/0068500 A1 | 2/2019 | Hira |
| 2019/0068689 A1 | 2/2019 | Ram et al. |
| 2019/0097838 A1 | 3/2019 | Sahoo et al. |
| 2019/0173757 A1* | 6/2019 | Hira .................. H04M 15/8083 |
| 2019/0173780 A1* | 6/2019 | Hira ........................ H04L 45/22 |
| 2019/0306185 A1 | 10/2019 | Katrekar et al. |
| 2020/0007497 A1 | 1/2020 | Jain et al. |
| 2020/0028758 A1 | 1/2020 | Tollet et al. |
| 2020/0067733 A1 | 2/2020 | Hira et al. |
| 2020/0067734 A1 | 2/2020 | Hira et al. |
| 2020/0177670 A1 | 6/2020 | Ram et al. |
| 2020/0351254 A1 | 11/2020 | Xiong et al. |
| 2021/0105208 A1 | 4/2021 | Hira |
| 2021/0258268 A1 | 8/2021 | Yu et al. |
| 2022/0255896 A1 | 8/2022 | Jain et al. |

FOREIGN PATENT DOCUMENTS

| | | |
|---|---|---|
| CN | 102255934 A | 11/2011 |
| CN | 102577255 A | 7/2012 |
| CN | 102577270 A | 7/2012 |
| CN | 102971724 A | 3/2013 |
| CN | 103930882 A | 7/2014 |
| CN | 103957270 A | 7/2014 |
| CN | 104104534 A | 10/2014 |
| CN | 104272672 A | 1/2015 |
| CN | 104871483 A | 8/2015 |
| CN | 105099953 A | 11/2015 |
| CN | 103036919 B | 12/2015 |
| CN | 105144110 A | 12/2015 |
| CN | 105379227 A | 3/2016 |
| CN | 106165358 A | 11/2016 |
| CN | 106789367 A | 5/2017 |
| CN | 106998284 A | 8/2017 |
| CN | 107077579 A | 8/2017 |
| CN | 107210959 A | 9/2017 |
| CN | 107534603 A | 1/2018 |
| CN | 107733704 A | 2/2018 |
| CN | 107959689 A | 4/2018 |
| EP | 1742430 A1 | 1/2007 |
| JP | 2014075731 A | 4/2014 |
| JP | 2015122088 A | 7/2015 |
| JP | 2015136132 A | 7/2015 |
| JP | 2015165700 A | 9/2015 |
| WO | 2015068255 A1 | 5/2015 |
| WO | 2015142404 A1 | 9/2015 |
| WO | 2016076900 A1 | 5/2016 |
| WO | 2016159113 A1 | 10/2016 |
| WO | 2018044341 A1 | 3/2018 |
| WO | 2019040720 A1 | 2/2019 |
| WO | 2019046071 A1 | 3/2019 |
| WO | 2019112704 A1 | 6/2019 |

(56) References Cited

FOREIGN PATENT DOCUMENTS

| WO | 2020005540 A1 | 1/2020 |
|---|---|---|
| WO | 2020041074 A1 | 2/2020 |

OTHER PUBLICATIONS

Black, David, et al., "An Architecture for Data Center Network Virtualization Overlays (NVO3) [draft-ietf-nvo3-arch-08]," Sep. 20, 2016, 34 pages, IETF.
Church, Mark, "Docker Reference Architecture: Designing Scalable, Portable Docker Container Networks," Article ID: KB000801, Jun. 20, 2017, 36 pages, retrieved from https://success.docker.com/article/networking.
Fernando, Rex, et al., "Service Chaining using Virtual Networks with BGP," Internet Engineering Task Force, IETF, Jul. 7, 2015, 32 pages, Internet Society (ISOC), Geneva, Switzerland, available at https://tools.ietf.org/html/draft-fm-bess-service-chaining-01.
Firestone, Daniel, "VFP: A Virtual Switch Platform for Host SDN in the Public Cloud," 14th USENIX Symposium on Networked Systems Design and Implementation, Mar. 27-29, 2017, 15 pages, USENIX, Boston, MA, USA.
Koponen, Teemu, et al., "Network Virtualization in Multi-tenant Datacenters," Proceedings of the 11th USENIX Symposium on Networked Systems Design and Implementation (NSDI'14), Apr. 2-4, 2014, 15 pages, Seattle, WA, USA.
Lasserre, Marc, et al., "Framework for Data Center (DC) Network Virtualization," RFC 7365, Oct. 2014, 26 pages, IETF.
Le Bigot, Jean-Tiare, "Introduction to Linux Namespaces—Part 5: NET," Jan. 19, 2014, 6 pages, retrieved from https://blog.yadutaf.fr/2014/01/19/introduction-to-linux-namespaces-part-5-net.
Lee, Wonhyuk, et al., "Micro-Datacenter Management Architecture for Mobile Wellness Information," 2014 International Conference on IT Convergence and Security, Oct. 28-30, 2014, 4 pages, IEEE, Beijing, China.
Lichtblau, Franziska, et al., "Detection, Classification, and Analysis of Inter-Domain Traffic with Spoofed Source IP Addresses," IMC '17: Proceedings of the 2017 Internet Measurement Conference, Nov. 2017, 14 pages, Association for Computing Machinery, London, UK.
Lin, Yu-Chuan, et al. "Development of a Novel Cloud-Based Multi-Tenant Model Creation Scheme for Machine Tools," 2015 IEEE International Conference on Automation Science and Engineering, Aug. 24-28, 2015, 2 pages, IEEE, Gothenburg, Sweden.
Ling, Lu, et al., "Hybrid Cloud Solution Based on SDN Architecture," Collection of Cloud Computing Industry Application Cases, Dec. 31, 2016, 20 pages, Issue 2, China Academic Journal Publishing House. [English translation of document generated from www.onlinedoctranslator.com].
Merkel, Dirk, "Docker: Lightweight Linux Containers for Consistent Development and Deployment," Linux Journal, May 19, 2014, 16 pages, vol. 2014—Issue 239, Belltown Media, Houston, USA.
Non-Published Commonly Owned Related U.S. Appl. No. 17/731,232, filed Apr. 27, 2022, 37 pages, VMware, Inc.
Non-Published commonly owned U.S. Appl. No. 17/114,322, filed Dec. 7, 2020, 50 pages, Nicira Inc.
Singla, Ankur, et al., "Architecture Documentation: OpenContrail Architecture Document," Jan. 24, 2015, 42 pages, OpenContrail.
Suen, Chun-Hui, et al., "Efficient Migration of Virtual Machines between Public and Private Cloud," 2011 IEEE Third International Conference on Cloud Computing Technology and Science, Nov. 29-Dec. 1, 2011, 5 pages, IEEE, Athens, Greece.
Sunliang, Huang, "Future SDN-based Data Center Network," Nov. 15, 2013, 5 pages, ZTE Corporation, available at http://wwwen.zte.com.cn/endata/magazine/ztetechnologies/2013/no6/articles/201311/t20131115_412737.html.
Wenjie, Zhu (Jerry), "Next Generation Service Overlay Networks," IEEE P1903 NGSON (3GPP Draft), Aug. 22, 2014, 24 pages, IEEE.
Zhang, Zhe, et al., "Lark: Bringing Network Awareness to High Throughput Computing," 15th IEEE/ACM International Symposium on Cluster, Cloud and Grid Computing, May 4-7, 2015, 10 pages, IEEE, Shenzhen, China.
Zheng, Guo, et al., "Study and Development of Private Cloud," Scientific View, Sep. 30, 2016, 2 pages. [English translation of abstract generated from Google Translate].
Li, Zhi, et al., "A New Multipath Routing Approach to Enhancing TCP Security in Ad Hoc Wireless Networks," 2005 International Conference on Parallel Processing Workshops (ICPPW'05), Jun. 14-17, 2005, 9 pages, IEEE, Oslo, Norway.
Non-Published Commonly Owned U.S. Appl. No. 18/244,244, filed Sep. 9, 2023, 117 pages, Nicira, Inc.

* cited by examiner

TRANSITIVE ROUTING IN PUBLIC CLOUD

CLAIM OF BENEFIT TO PRIOR APPLICATION

This application is a continuation application of U.S. patent application Ser. No. 16/112,597, filed Aug. 24, 2018, now published as U.S. Patent Publication 2020/0067733. U.S. patent application Ser. No. 16/112,597, now published as U.S. Patent Publication 2020/0067733, is incorporated herein by reference.

BACKGROUND

Integrating overlay logical networks into cloud provider networks introduces new challenges not found in either system alone. For example, virtual private clouds (VPCs) provided by some cloud providers do not allow for transitive routing using the cloud-provided network making it difficult to route traffic requiring a service provided at a service VPC to the service VPC as part of a route from a source VPC to a destination VPC. Additionally, some services provided by a cloud provider rely on the use of the cloud-provider assigned addresses and don't integrate well with compute nodes assigned addresses in an overlay logical network.

BRIEF SUMMARY

Some embodiments provide a centralized overlay-network cloud gateway and a set of centralized services in a transit virtual cloud network (VCN) connected to multiple other compute VCNs hosting compute nodes (VMs, containers, etc.) that are part of (belong to) the overlay network. The centralized overlay-network cloud gateway executing in the transit VCN, in some embodiments, is used in place of multiple overlay-network cloud gateways executing in multiple non-transit VCNs to reduce the cost and management overhead. The centralized overlay-network cloud gateway provides connectivity between compute nodes of the overlay network (e.g., a logical network spanning multiple VCNs) and compute nodes in external networks. In some embodiments, the centralized overlay-network cloud gateway also provides services for data messages it processes. The services, in some embodiments, are provided by some combination of the cloud gateway and third party services accessed through or by the gateway.

Some embodiments use the centralized overlay-network cloud gateway to provide transitive routing (e.g., routing through a transit VPC) in the absence of direct peering between source and destination VPCs. The cloud gateway, in some embodiments, is accessed from each VPC through a peering relationship established between the transit VPC and the VPC. In some embodiments, a managed forwarding element (MFE) implementing a logical routing element (LRE) that connects the logical switching elements of the logical network to a centralized logical routing element implemented by the cloud gateway performs a set of forwarding operations to direct a data message to the transit VPC. The overlay network, of some embodiments, uses the same subnetting and default gateway address for each compute node as the cloud provider network provided by the virtual private cloud provider. Using the same address space as the cloud provider network allows seamless integration of services provided by the cloud provider network and with the novel method of forwarding data messages disclosed herein also allows seamless integration with services provided by an overlay network.

In embodiments using the same address space in both the cloud provider and overlay networks, in order to direct traffic properly (i.e., either using the cloud provider network infrastructure or through tunnels used to implement the overlay network), some embodiments provide a method and arbiter module (e.g., as part of a managed forwarding element implementing a hybrid switching element that provides logical forwarding for both the overlay and cloud provider networks) for determining the proper method for forwarding data messages sent by the compute nodes. In some embodiments, the arbiter module determines whether a destination compute node is in a same or different VPC from the source compute node. When source and destination compute nodes are on a same VPC, the default behavior is to route using the cloud provider infrastructure. However, a user (e.g., an administrator) can override this default behavior and use the overlay network (i.e., tunneling to the cloud gateway in the transit VPC) if a centralized service is to be provided by a service engine in a transit VPC. When source and destination compute nodes are on different VPCs, the default behavior is to route the data message using the overlay network (i.e., the cloud gateway in the transit VPC). The method allows an administrator to override the default behavior for data messages (1) that do not need a service provided by a service engine in the transit VPC and (2) for which a peering (e.g., a tunnel provided by the cloud provider infrastructure) exists between a source VC and a destination VPC.

In some embodiments, the default behavior for data messages between compute nodes in VPCs connected by a cloud provider tunnel (e.g., peered VPCs) is to route the data message using the overlay logical network and the centralized overlay-network cloud gateway. In order to override the default and use the peering relationship to forward data messages between VPCs, in some embodiments, an administrator configures a policy-based routing (PBR) rule in an arbiter module of an MFE that directs the MFE to forward the data message using the peering between the VPCs. If no PBR rule or other method is used to override the default behavior, data messages for which a service provided in the transit VPC is required are routed using the overlay network based on a routing table of a distributed router implementation. In some embodiments, the routing decisions are configured by a PBR implementation that determines a next hop based on a policy that can be defined by characteristics of a data message or data message flow in addition to the destination address (e.g., a five-tuple specifying a source IP address/port number and destination IP address/port number as well as a protocol).

In some embodiments, the default behavior for data messages between compute nodes in VPCs connected by a cloud provider tunnel (e.g., peered VPCs) is to route the data message using the cloud provider tunnel. In such embodiments, data messages for which a service provided in the transit VPC is required are routed using the overlay network by having an administrator remove routes to the destination compute node (e.g., the route associated with the IP address or subnet of the destination compute node) from a routing table of a distributed router implementation. In some embodiments, the routing decisions are configured by a policy-based routing implementation that determines a next hop based on a policy that can be defined by characteristics of a data message or data message flow in addition to the destination address (e.g., a five-tuple specifying a source and destination IP and MAC address as well as a port or protocol).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
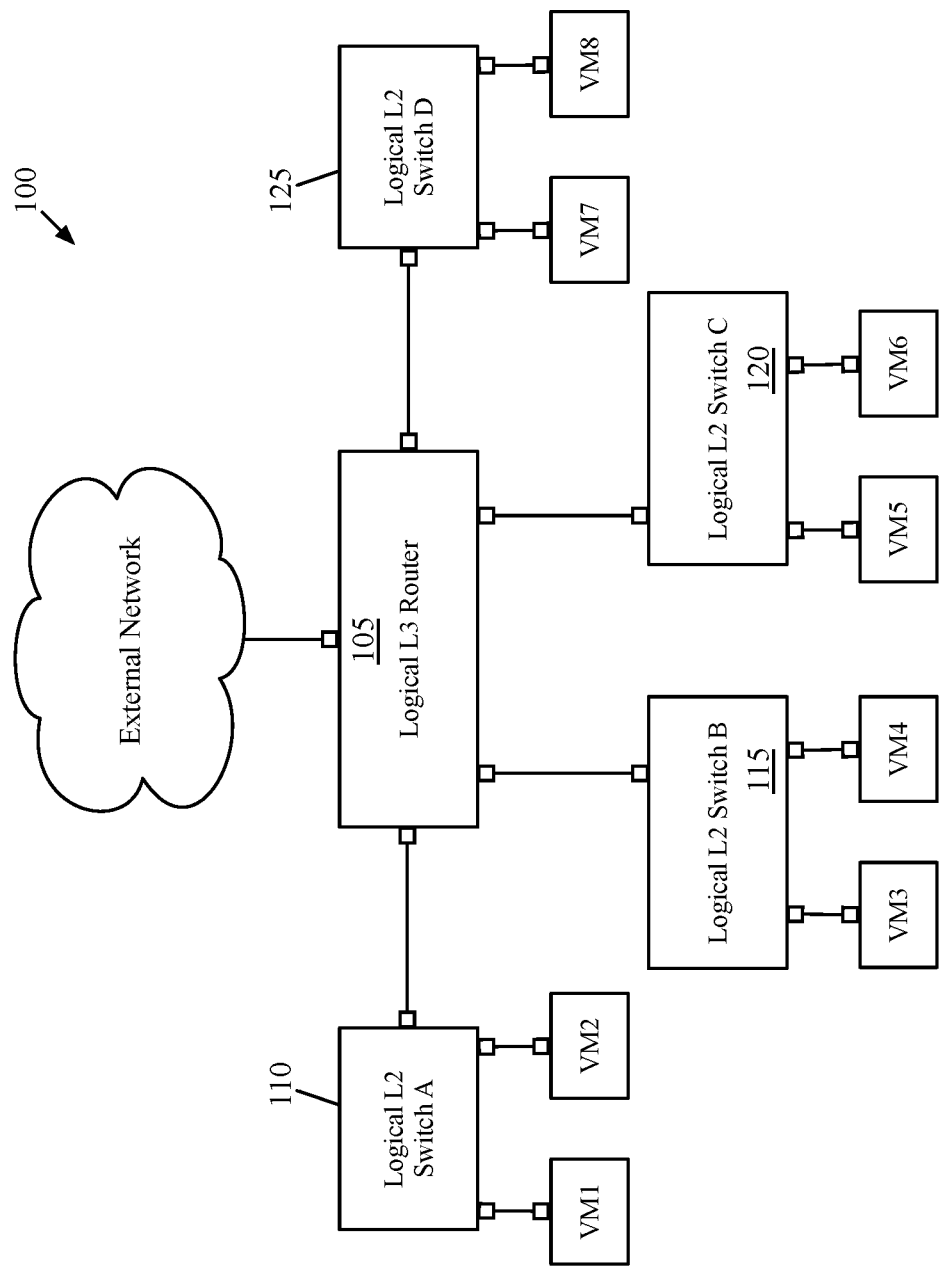
FIG. 1 conceptually illustrates a logical topology of some embodiments, as an administrator might input the topology into the management plane.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a centralized overlay-network cloud gateway and a set of centralized services in a transit virtual cloud network (VCN) connected to multiple other compute VCNs hosting compute nodes (VMs, containers, etc.) that are part of (belong to) the overlay network. The centralized overlay-network cloud gateway executing in the transit VCN, in some embodiments, is used in place of multiple overlay-network cloud gateways executing in multiple non-transit VCNs to reduce the cost and management overhead. The centralized overlay-network cloud gateway provides connectivity between compute nodes of the overlay network (e.g., a logical network spanning multiple VCNs) and compute nodes in external networks. In some embodiments, the centralized overlay-network cloud gateway also provides services for data messages it processes. The services, in some embodiments, are provided by some combination of the cloud gateway and third party services accessed through or by the gateway.

A logical network as used in this application, refers to a particular logical abstraction of a network. In some embodiments, the logical abstraction includes logical counterparts to network elements of a physical network such as forwarding elements (e.g., switches, hubs, routers, bridges, etc.), load balancers, and firewalls. The logical forwarding elements (e.g., a logical switch or logical router) in some embodiments are implemented by a set of MFEs (e.g., physical or virtual/software switches, or routers) executing on host machines. A particular host machine may host data compute nodes (DCNs) (e.g., containers or virtual machines (VMs)) connected to multiple different logical networks and the set of MFEs implements all the logical networks to which the DCNs logically connect. Further details about logical networks and about logical networks implemented as overlay logical networks in a public cloud environment specifically can respectively be found in U.S. Pat. No. 9,787,605 and U.S. Patent publication number 2018/0062923 which are incorporated herein by reference.

The DCNs, in some embodiments, are hosted by a cloud provider (e.g., Amazon Web Services (AWS) or Microsoft Azure (Azure)) that provides VCNs (e.g., virtual private clouds (VPCs) for AWS or virtual networks (VNets) for Azure) for at least one tenant. Each VCN is a virtual network that is logically isolated from other physical networks and from other virtual networks (e.g., VCNs) provided by the cloud provider. In some embodiments, a cloud provider provides VCNs for multiple tenants with a set of tenants having multiple VCNs. For each VCN, a private range of IP addresses is specified (e.g. a range of IPv4 and/or IPv6 addresses) for communication within the VCN. Communication between compute nodes within a VCN uses the public cloud provider infrastructure and stay within the VCN at the level of the logical specification of the VCN. If a peering relationship is established between VCNs, the private IP addresses of a destination compute node in a different VCN can be used in sending a data message and the data message will not need to be processed by an internet gateway provided by the cloud provider. Instead, in some embodiments, the data message is forwarded using the same methodology as used for intra-VCN traffic.

In some embodiments, peering is implemented by the cloud provider by modifying the configuration of an underlay routing element (e.g., by adding routing entries, modifying security rules, etc.) such that compute nodes in peered VCNs communicate as if they are in a same VCN. In some embodiments, when two VCNs are not peered, the underlay routing elements enforce this by preventing direct communication between the compute nodes in the two unpeered VCNs (e.g., using security rules for preventing the private IP addresses of one VCN from communicating with the private IP addresses of the other VCN). It should also be noted that, in some embodiments, peering is not transitive and compute nodes in two VCNs peered with a common VCN (but not with each other) cannot communicate using the private IP addresses of the unpeered VCNs.

In some other embodiments, inter-VCN traffic traverses specific interfaces of the cloud provider underlay (e.g., gateway forwarding elements). That is, in such embodiments, these specific interfaces in the source and/or destination VCNs enforce the peering relationships through a set of routing tables and/or security rules. In such embodiments, the routing tables and security rules of each interface are modified to allow traffic that arrives at the cloud-provider gateway devices destined for a peered VCN to be forwarded to the cloud-provider gateway device of the peered VCN. Without peering, in such embodiments, the cloud-provider gateway devices would not forward traffic to the cloud-provider gateway device of an unpeered VCN.

A range of unique public IP addresses can additionally be specified in order to allow communications with an external network such as the internet through an internet gateway provided by the cloud provider. Communication between compute nodes in unpeered VCNs, in some embodiments, uses the internet gateway provided by the cloud provider and a public IP address associated with the public IP address of the unpeered VCN. In some embodiments, each VCN for a particular tenant has a different range of private IP addresses specified. A VCN, in some embodiments, spans multiple physical datacenters and is further broken up into availability zones that each span separate sets of physical datacenters such that no datacenter supports more than one availability zone.

By expanding a logical network into one or more public datacenters, a logical topology may be stretched across these datacenters. Some embodiments confine the VMs attached to a given logical switch to one physical datacenter, while other embodiments allow for even a single logical switch to be stretched across multiple datacenters (e.g., a set of datacenters supporting an availability zone).

FIG. 1 conceptually illustrates a logical topology 100 of some embodiments, as an administrator might input the topology into the management plane. In some embodiments, the logical topology input into the management plane is implemented in the VCN. As shown, the logical topology 100 includes a logical router 105 and four logical switches 110-125. Two virtual machines are attached to each logical switch, and the logical router 105 includes an uplink port to an external network. In this case, only one tier of logical router is shown in the logical network, although some embodiments could also include multiple tiers of logical routers. In addition, the management plane of some embodiments might define several logical routing components (e.g., a distributed router and one or more centralized service routers) for the logical router 105. The multiple tiers of logical routers and creation of multiple routing components for a logical router are described in further detail in U.S. Pat. No. 9,787,605, which is incorporated herein by reference. However, a short summary of logical routing components and possible implementations are provided below.

A logical router, in some embodiments, comprises multiple logical routing components including a distributed logical router, a transit logical switch and a centralized (service) router. In some embodiments, a distributed logical router is implemented by a set of local MFEs (e.g., a local MFE executing in each VCN, or by each MFE implementing a logical switching element of the logical network). The distributed logical router performs routing for data message and can determine a logical switch to which the data message should be forwarded. In some instances, a transit logical switch is a logical switching element that is used only by the logical routing element to connect the distributed logical routing component to a centralized (service) logical routing component of the logical routing element. Both local and centralized MFEs, in some embodiments, implement distributed logical router components and transit logical switch components, while centralized MFEs implement the centralized (service) logical router. In some embodiments, the centralized logical router serves as a gateway to external networks for compute nodes in a tenant logical network.

The logical switches 110-125 attached to the logical router 105 are each assigned a subnet, in some embodiments, and thus the workload VMs created to attach to a particular logical switch should be assigned IP addresses in the appropriate subnet. In some embodiments, the logical topology is defined for both the overlay network and the VCN implementation such that the IP addresses (subnets and individual DCN IP addresses) assigned by the VCN can be, and are, used by the overlay logical switches and routers to allow the applications to continue operating with the IP addresses from the cloud provider, thereby facilitating easy seamless integration with other services provided by the cloud provider, such as storage or load balancing services. In some embodiments, this is accomplished by determining the cloud-provider assigned addresses using APIs provided by the cloud provider (i.e., the provider of the VCN) and using them for the overlay network as well (e.g., assigning the IP address assigned to a VM by the cloud provider to the tunnel endpoint created for the MFE operating on the VM). However, in some embodiments the IP address of the VM with regard to the cloud provider is different than the IP address of the logical port mapped to that VM, as the IP address facing the cloud provider network is that of the tunnel endpoint created for the MFE operating on the VM. For example, the logical switch 110 in some embodiments is assigned the subnet 192.168.1.0/24 in the overlay while being assigned 10.1.0.0/24 by the cloud provider. In addition, two VMs are shown attached to the logical switch 110.

Figure 2:
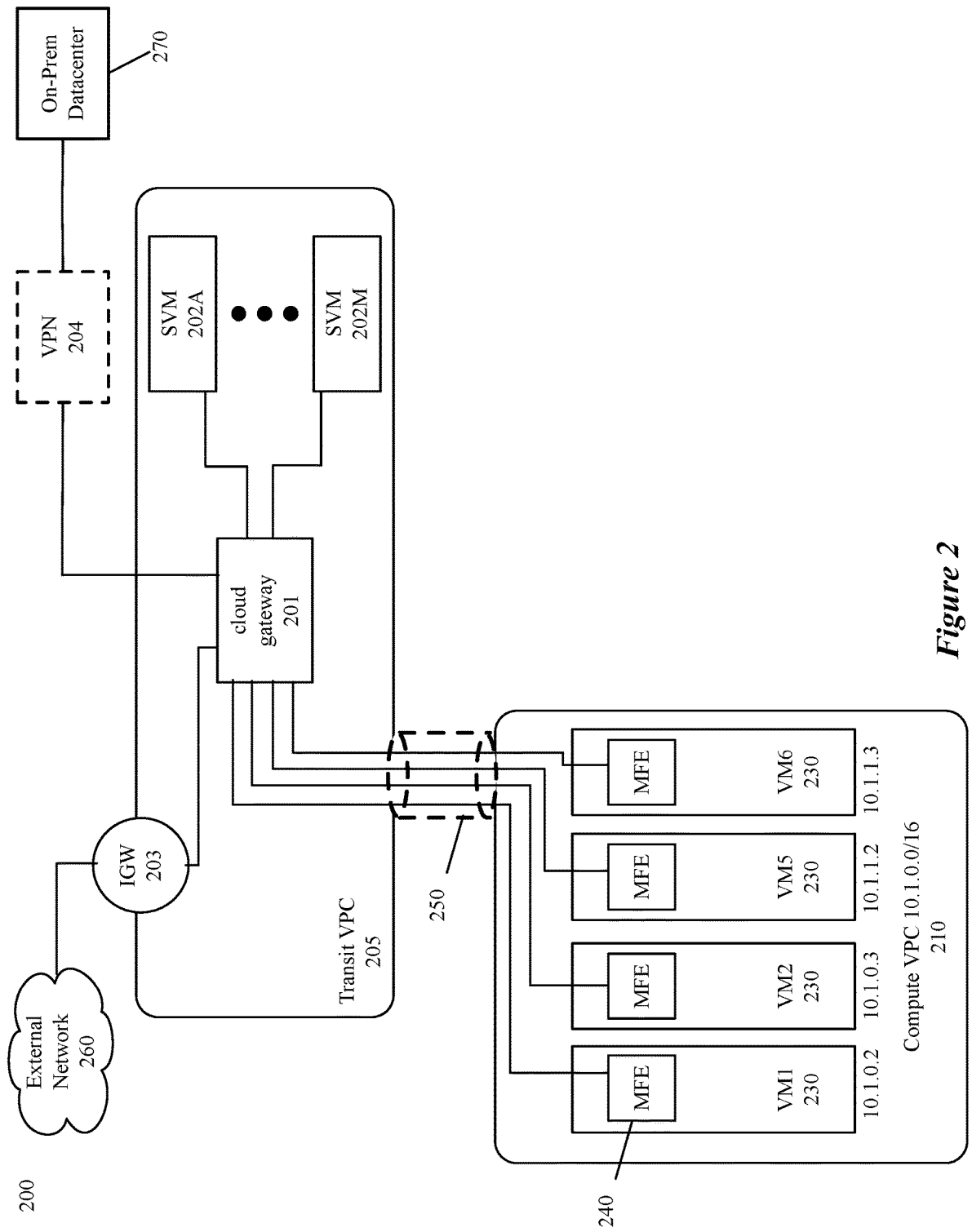
FIG. 2 illustrates an embodiment using a centralized transit VPC providing access to external network for compute nodes executing in a compute VPC.

FIG. 2 illustrates an embodiment in AWS using a centralized transit VPC 205 providing access to external network 260 for compute nodes (e.g., VMs 230) executing in a compute VPC 210. FIG. 2 illustrates an example of four VMs 230 attached to the two of the four logical switches 110 and 120, as implemented within a single compute VPC 210 of a single public cloud provider along with a transit VPC 205 implementing a cloud gateway 201, a set of service compute nodes (SVMs 202A-M), and cloud provider internet gateway 203. FIG. 2 also illustrates an external network 260, an on-premises datacenter 270 (e.g., a datacenter run by the owner of the VMs 230) and a VPN tunnel 204 connecting the transit VPC 205 to the on-premises datacenter. In this example, each logical switch is contained within a single VPC (e.g., all of the VMs attached to a logical switch 110 and 120 are instantiated in the same VPC), with multiple logical switches instantiated in VPC 210. VPC 210 is assigned a subnet 10.1.0.0/16, which may be a public or private subnet depending on how the administrator has configured the VPC on the public cloud. In this example, the MFEs are all operating in a hybrid mode that allows the VM IP address (e.g., MFE tunnel endpoint IP address) to be the same as the workload application IP address (i.e., the IP address associated with the logical switch port). An MFE operating in a hybrid mode determines whether to forward data messages sent by the workload application through the logical network (overlaid on the cloud provider network) or directly through the cloud provider network.

As shown, each of the VMs is assigned a different workload IP (e.g., 10.1.0.2, 10.1.0.3, etc.) in the IP subnet assigned to the logical switch (e.g., 10.1.0.0/24) to which it connects, the IP subnet of the logical switch being an IP subnet of the subnet assigned to the VPC in which it is implemented (e.g., 10.1.0.0/16). These IP addresses, in some embodiments, are identical to the IP addresses assigned to the VM (or the virtual extensible local area network tunnel endpoint (VTEP) of the MFE operating on the VM) by the cloud provider. Forwarding operations performed by an MFE implementing a hybrid logical switch for such embodiments are discussed in more detail below.

In other embodiments, each of the VMs is assigned a different workload IP in a subnet of the logical network that is not the same as the logical switch subnet assigned by the cloud provider (e.g., the 192.168.1.0/24 subnet instead of the 10.1.1.0/24 subnet). When the workload application in these embodiments sends a packet, this different workload IP address will be the source IP used in the header of that packet. However, the MFEs operating on these VMs have VTEPs with different IP addresses on the VPC subnets (10.1.0.2, 10.1.0.3, 10.10.0.2, 10.10.0.3, etc.). The packets that exit the VM will thus be encapsulated using this VTEP IP address as the source IP address (after logical processing is performed by the MFE in the source VM), in order to be sent to other destinations in the VPC.

The figure also illustrates tunnels between these four MFEs and a cloud gateway 201 in the transit VPC 205. The tunnels in some embodiments use a peering relationship between compute VPC 210 and transit VPC 205 illustrated as network connection 250. The cloud gateway 201 provides connectivity for the overlay logical network to external network 260 and on-premises datacenter 270. As shown, the cloud gateway 201 connects to external network 260 through internet gateway 203. Internet gateway 203 is provided, in some embodiments, by the cloud provider as part of the deployment of transit VPC 205. The tunnels connecting the MFEs to the cloud gateway 201 pass through the underlying network of the public cloud provider (referred to herein as the "underlay"). In addition, though not shown here for simplicity, tunnels are created (through the underlay network) between each pair of the MFEs operating on the VMs 230. In some embodiments, the data message passes through additional managed forwarding elements in one of the compute VPC and the transit VPC or in both the compute and transit VPC between the illustrated MFE and the cloud gateway. In some embodiments, the intermediate MFEs implement additional intermediary logical forwarding elements.

The cloud gateway 201 can also send packets to (and receive packets from) destinations within an on-premises private datacenter 270. To send these packets, the cloud gateway 201 encapsulates the packets using its VTEP IP, so that the destination will identify the incoming packet as a logical network packet. To secure traffic between the cloud gateway 201 in the VPC 205 and the destinations in the private datacenter (e.g., VMs attached to a logical switch), the packets are sent via a VPN tunnel 204 in some embodiments. In this example, the components of the cloud gateway device 201 are not shown but are discussed in more detail in U.S. Patent publication number 2018/0062923 which is incorporated herein by reference.

Cloud gateway 201, in some embodiments, is a gateway compute node (e.g., a virtual machine) that provides access to external networks (e.g. forwards north-south traffic) to compute nodes inside the logical network. In some embodiments, cloud gateway 201 also provides services to north-south traffic received at cloud gateway 201. Services provided at the cloud gateway 201 include, in some embodiments, any one or more of a firewall service, a load balancing service, a network address translation service, intrusion detection, VPN, audit logging, service chaining (sending data messages to third-party service appliances (e.g., SVMs 202) for various middlebox processing). The services provided to traffic received at cloud gateway 201, in some embodiments, are provided by forwarding the traffic to a service compute node such as one of SVMs 202A-M executing in the Transit VPC 205. SVMs 202A-M, in some embodiments, provide a set of logical network services and a set of third party services. Having a centralized cloud gateway allows third-party appliances for north-south logical network traffic to also be centralized to the transit VPC in some embodiments leading to further cost and management overhead reductions.

Figure 3:
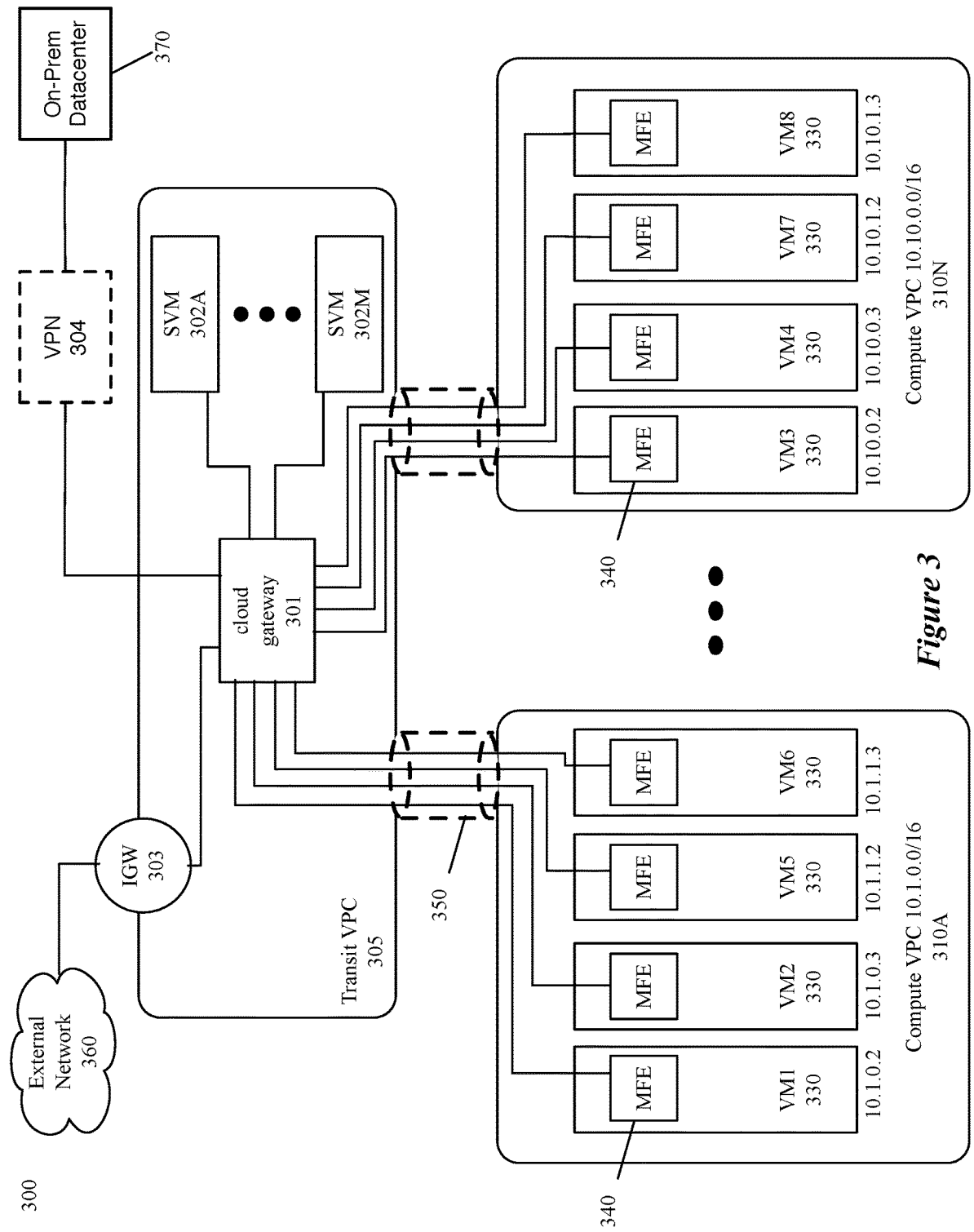
FIG. 3 illustrates an embodiment using a centralized transit VPC providing both transitive routing and access to external network for compute nodes executing in any of a plurality of compute VPCs.

FIG. 3 illustrates an embodiment using a centralized transit VPC 305 providing both transitive routing (i.e., routing from a first VPC to a second VPC through a third transit VPC) and access to external network 260 for compute nodes (e.g., VMs 230) executing in any of compute VPCs 310A-N. FIG. 3 illustrates an example of eight VMs 330 attached to the four logical switches 110-125, as implemented within a plurality of compute VPCs 310A-N (specifically shown implemented in VPCs 310A and 310N) of a single public cloud provider along with a transit VPC 305 implementing a cloud gateway 301, and a set of service compute nodes (SVMs 302A-M), cloud provider internet gateway 303. FIG. 3 also illustrates an external network 360, an on-premises datacenter 370 (e.g., a datacenter run by the owner of the VMs 330) and a VPN tunnel 304 connecting the transit VPC 305 to the on-premises datacenter 370. In this example, each logical switch spans a single VPC (e.g., all of the VMs attached to a logical switch 110-125 are instantiated in the same VPC), with VMs attached to multiple logical switches instantiated in each VPC. In some embodiments not using the cloud-provider assigned addresses, logical switches span multiple VPCs as described in U.S. Patent publication number 2018/0062923. VPC 310A is assigned a subnet 10.1.0.0/16, while VPC 310B is assigned a subnet 10.10.0.0/16, either of which may be a public or private subnet depending on how the administrator has configured the VPC on the public cloud. In this example (and the other examples in this section), the MFEs are all operating in a hybrid mode that allows the VM IP address (e.g., MFE tunnel endpoint IP address) to be the same as the workload application IP address (i.e., the IP address associated with the logical switch port). An MFE operating in a hybrid mode determines whether to forward data messages sent by the workload application through the logical network (overlaid on the cloud provider network) or directly through the cloud provider network.

As shown, each of the VMs is assigned a different workload IP (e.g., 10.1.0.2, 10.10.0.3, etc.) in the IP subnet assigned to the logical switch (e.g., 10.1.0.0/24. 10.10.0.0/ 24, etc.) to which it connects. The IP subnet of the logical switch is an IP subnet of the subnet assigned to the VPC in which it is implemented (e.g., 10.1.0.0/16 or 10.10.0.0/16). These IP addresses, in some embodiments, are identical to the IP addresses assigned to the VM (or the VTEP of the MFE operating on the VM) by the cloud provider. Forwarding operations performed by an MFE implementing a hybrid logical switch for such embodiments are discussed in more detail below.

In other embodiments, each of the VMs is assigned a different workload IP in a subnet of the logical network that is not the same as the logical switch subnet assigned by the cloud provider (e.g., the 192.168.1.0/24 subnet instead of the 10.1.1.0/24 subnet). When the workload application in these embodiments sends a packet, this different workload IP address will be the source IP used in the header of that packet. However, the MFEs operating on these VMs have VTEPs with different IP addresses on the VPC subnets (10.1.0.2, 10.1.0.3, 10.10.0.2, 10.10.0.3, etc.). The packets that exit the VM will thus be encapsulated using this VTEP IP address as the source IP address (after logical processing is performed by the MFE in the source VM), in order to be sent to other destinations in the VPC.

The figure also illustrates tunnels between these eight MFEs and a cloud gateway 301 in the transit VPC 305. The tunnels in some embodiments use a peering relationship between compute VPCs 310A-N and transit VPC 305 illustrated as network connections 350. These tunnels pass through the underlying network of the public cloud provider (referred to herein as the "underlay"). In addition, though not shown here for simplicity, tunnels are created (through the underlay network) between each pair of the MFEs operating on the VMs 330. These tunnels between the MFEs 340 and the cloud gateway 301 are used to forward traffic between compute nodes (e.g., VMs, containers, etc.) that are implemented by different VPCs if, for example, there is no peering between the source and destination VPCs or a centralized service provided by or through the cloud gateway 301 is required for the traffic.

The cloud gateway 301 can also send packets to (and receive packets from) destinations within an on-premises private datacenter 370. To send these packets, the cloud gateway 301 encapsulates the packets using its VTEP IP, so that the destination will identify the incoming packet as a logical network packet. To secure traffic between the cloud gateway 301 in the VPC 305 and the destinations in the private datacenter (e.g., VMs attached to a logical switch), the packets are sent via a VPN tunnel 304 in some embodiments. In this example, the gateway's connection to external networks is not shown, and is discussed in more detail in U.S. Patent publication number 2018/0062923 which is incorporated herein by reference.

Cloud gateway 301, in some embodiments, is a gateway compute node (e.g., a virtual machine) that provides access to external networks (e.g. forwards north-south traffic) to compute nodes inside the logical network. In some embodiments, cloud gateway 301 also provides services to traffic (both north-south and east-west) received at cloud gateway 301. Services provided at the cloud gateway 301 include, in some embodiments, any one or more of logical routing, a firewall service, a load balancing service, a network address translation service, intrusion detection, VPN, audit logging, service chaining (sending data messages to third-party service appliances (e.g., SVMs 302) for various middlebox processing). The services provided to traffic received at cloud gateway 301, in some embodiments, is provided by forwarding the traffic to a service compute node such as one of SVMs 302A-M executing in the Transit VPC 305. SVMs 302A-M, in some embodiments, provide a set of logical network services and a set of third party services. Having a centralized cloud gateway allows third-party appliances for north-south and east-west logical network traffic to also be centralized to the transit VPC in some embodiments leading to further cost and management overhead reductions.

Although embodiments described above and throughout the rest of the description are discussed in terms of a single transit VPC and cloud gateway, other embodiments implement a cloud gateway as a cluster of two or more cloud gateway devices in active-active or active-standby mode in a single transit VPC. Still other embodiments implement a cluster of two or more transit VPCs each hosting a cloud gateway device that are configured in one of active-active or active-standby configuration. Cloud gateways (or transit VPCs) in active-active mode are each addressable by compute nodes in the logical network and are load balanced in some embodiments or are addressed by a same multicast address. In such embodiments, MFEs are configured as described in relation to FIG. 5 below to route data messages to a specific gateway device/transit VPC or to any of the active gateway devices/transit VPCs. In some embodiments, stateful processing is maintained by an assignment of specific flows to specific cloud gateway devices/transit VPCs based on a sharding (e.g., based on source or destination IP address) or hashing (e.g., based on a hash of an n-tuple that defines a flow). In active-standby configuration, a single cloud gateway device/transit VPC acts as the cloud gateway/transit VPC with additional devices or VPCs in the cluster providing redundancy in case the active device/transit VPC fails.

Figure 4:
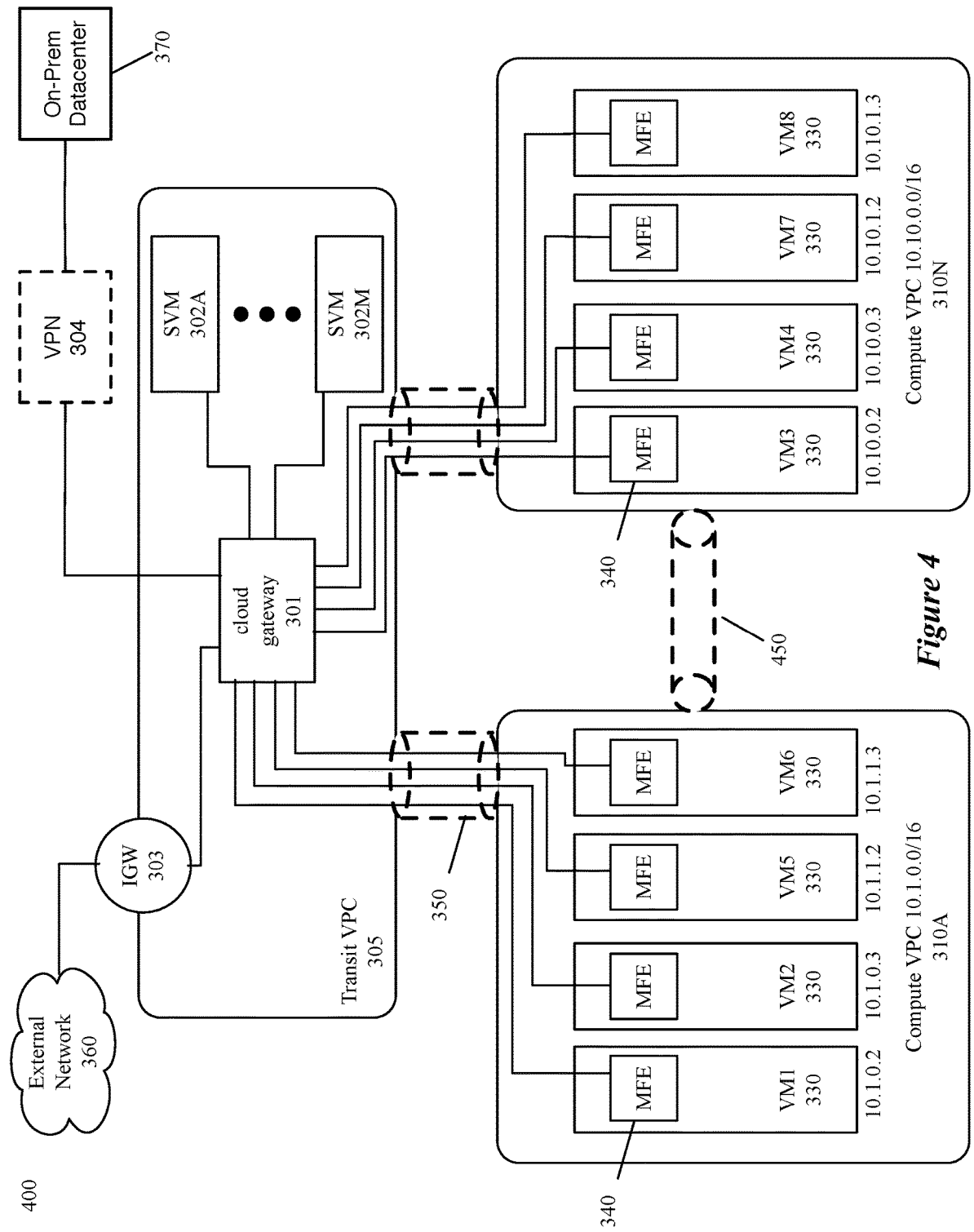
FIG. 4 illustrates a system that is mostly identical to the system of FIG. 3 but with an additional peering relationship indicated by a connection existing between VPCs.
Figure 5:
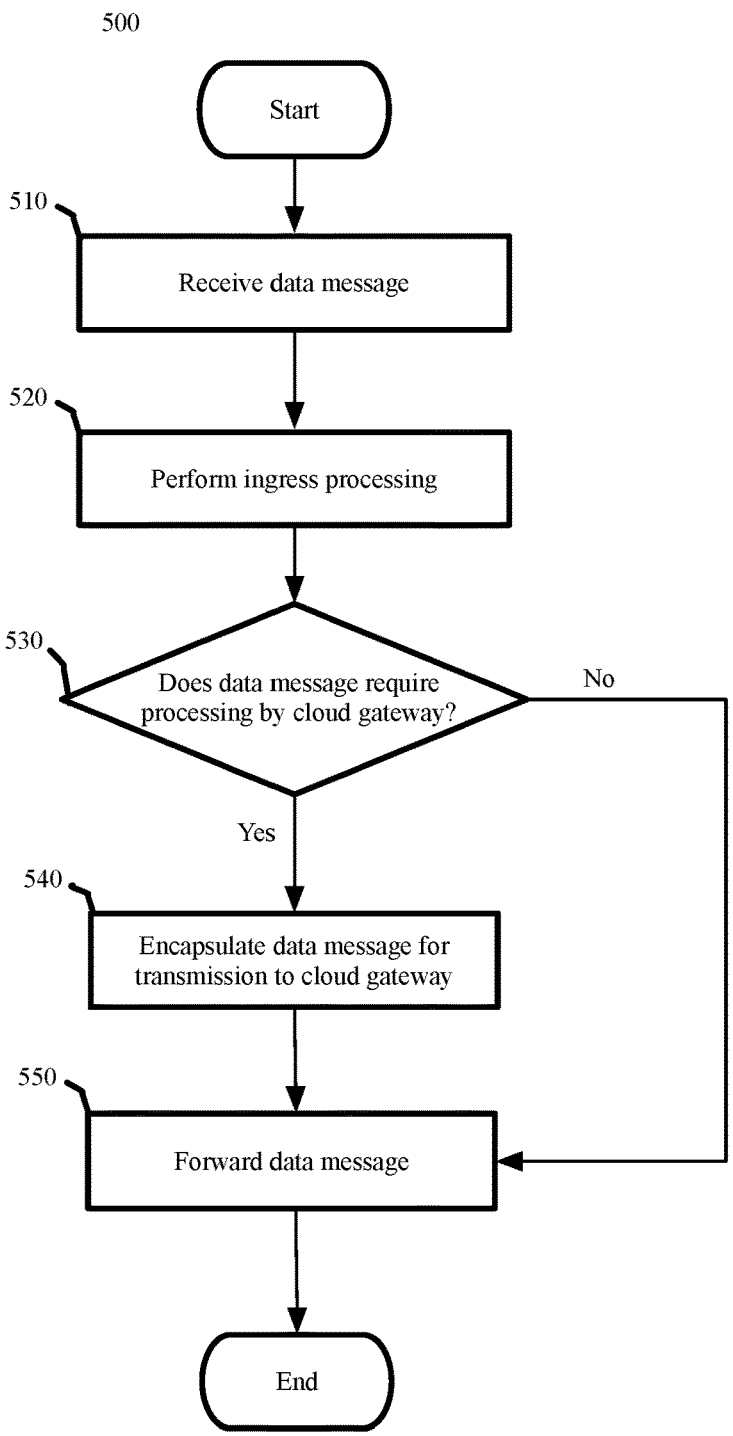
FIG. 5 conceptually illustrates a process performed by a managed forwarding element (MFE) to intelligently forward a data message received from a compute node using one of the overlay or cloud provider network.

FIG. 4 illustrates a system 400 that is mostly identical to the system 300 of FIG. 3 but with an additional peering relationship indicated by connection 450 existing between VPCs 310A and 310N. In system 400, in addition to being able to forward data messages between VPCs 310A and 310N through transit VPC 305 (and cloud gateway 301), data messages can also be forwarded using the peering relationship. FIG. 5 conceptually illustrates a process for making use of existing peering and intra-VPC connectivity along with the centralized cloud gateway device.

FIG. 5 conceptually illustrates a process performed by a managed forwarding element (MFE) to intelligently forward a data message received from a compute node using one of the overlay or cloud provider network. The process begins (at 510) by receiving a data message from a compute node (e.g., a virtual machine or container) destined for another compute node. Different data messages are destined for different compute nodes in different virtual private clouds and require different services. In some embodiments, the cloud provider provides some services while other services are provided by an element of the overlay network. In some embodiments, the services provided by the cloud provider are of a same type (e.g., firewall, load balancing, WAN optimization, etc.) as those provided by the elements of the overlay network.

Upon receiving the data message, the MFE performs (at 520) ingress processing. In some embodiments, the ingress processing includes a distributed firewall operation. After ingress processing, in some embodiments the MFE consults an arbiter to determine (at 530) whether the data message requires processing by a cloud gateway executing in the transit VPC. In some embodiments, the arbiter is part of the MFE. The determination, in some embodiments, is based on whether the destination of the data message is in a same VPC as the source of the data message, whether any centralized services are required for the data message, and whether a peering exists between the source and destination VPCs.

In some embodiments, a determination that a destination compute node is in a same VPC as the source compute node is based on whether a destination IP address of the data message falls within a range of IP addresses assigned to the VPC of the source compute node. Determining whether the data message requires a centralized service is based, in some embodiments, on a policy-based routing policy or other form of policy received from a network controller. The policy, in some embodiments, is specified in terms of a tuple associated with data messages (e.g., a five-tuple specifying source and destination IP address, source and destination port and protocol). In some embodiments, the determination that a data message requires a centralized service is made implicitly based on a lack of a routing entry for the destination IP address after having the routing table processed to remove routes to addresses that are not available from the VPC or that require routing through the cloud gateway in the transit VPC (as discussed in relation to FIG. 8). Similarly, the determination whether a peering exists between a source and destination VPC, in some embodiments, is based on whether or not a route for the destination IP address in a destination VPC exists in a routing table of the source VPC (or MFE implementing a logical router of the overlay network). In some embodiments, information regarding whether a peering between a source VPC and a destination VPC exists is provided by a user (e.g., a system administrator) and is pushed to the MFEs executing at the different VPCs.

In some embodiments that implicitly determine whether a data message requires forwarding to the cloud gateway in the transit VPC (either because it needs a service or because there is no peering with a destination VPC), the MFE (or separate managed switching and routing elements as discussed below) or arbiter module performs logical switching and routing operations associated with logical switching and routing elements of the overlay network (e.g. a tenant logical network). Logical switching operations include, in some embodiments, identifying an egress logical port of the logical switching element that receives the data message from a source compute node and logically forwarding the data message to the egress logical port connected to a logical routing element. The logical routing operations, in some embodiments, include implementing a distributed logical router to identify a logical port of the logical routing element associated with the destination address of the data message. As discussed above the distributed logical router is configured, in some embodiments, to cause data messages that (1) require a service provided at the overlay cloud gateway or (2) that are destined for VPC for which no peering relationship exists from a source VPC to be routed to the cloud gateway. In some embodiments, this is equivalent to the distributed logical routing element determining that the data message should be forwarded to a centralized service routing element implemented by the overlay cloud gateway.

A data message requires processing by an overlay cloud gateway (e.g., a device implementing a logical router to provide access to external network for compute nodes in the overlay network), in some embodiments, if the data message (1) requires a centralized service provided by the cloud gateway (whether source and destination VPCs are the same or different) or (2) is destined to a VPC that is not peered to the source VPC. Conversely, a data message does not require processing by the overlay cloud gateway if (1) the data message is destined to a compute node in the same VPC and does not require a centralized service provided by the cloud gateway or (2) the data message is destined to a compute node on a VPC that is peered with the VPC of the source compute node and the data message does not require a centralized service.

If the process determines (at 530) that the data message requires processing by the cloud gateway, the process encapsulates (at 530) the data message with a header that directs the packet to a tunnel endpoint of the cloud gateway. In some embodiments, the tunnel endpoint is a Virtual Extensible Local Area Network (VXLAN) Tunnel Endpoint (VTEP). The encapsulation, in some embodiments, is a generic network virtualization encapsulation (GENEVE) header.

If the process determines (at 530) that the data message does not require processing by the cloud gateway or determines (at 530) that the data message requires processing by the cloud gateway and has encapsulated (at 540) the data message, the process forwards the data message to the destination. In some embodiments, the data message is forwarded to a forwarding element of the cloud provider and the process ends. The cloud-provider forwarding element, in some embodiments provides a further encapsulation to traverse the physical network on which the virtual private cloud is implemented.

In some embodiments, data messages encapsulated to be forwarded to the cloud gateway are received at the cloud gateway which then decapsulates the data message, provides any required services, and forwards the data message to the destination compute node. As the transit VPC on which the cloud gateway is peered with each VPC hosting compute nodes of the overlay network, in some embodiments, the forwarded data message does not require encapsulation to be forwarded from the cloud gateway to the destination compute node.

Figure 6:
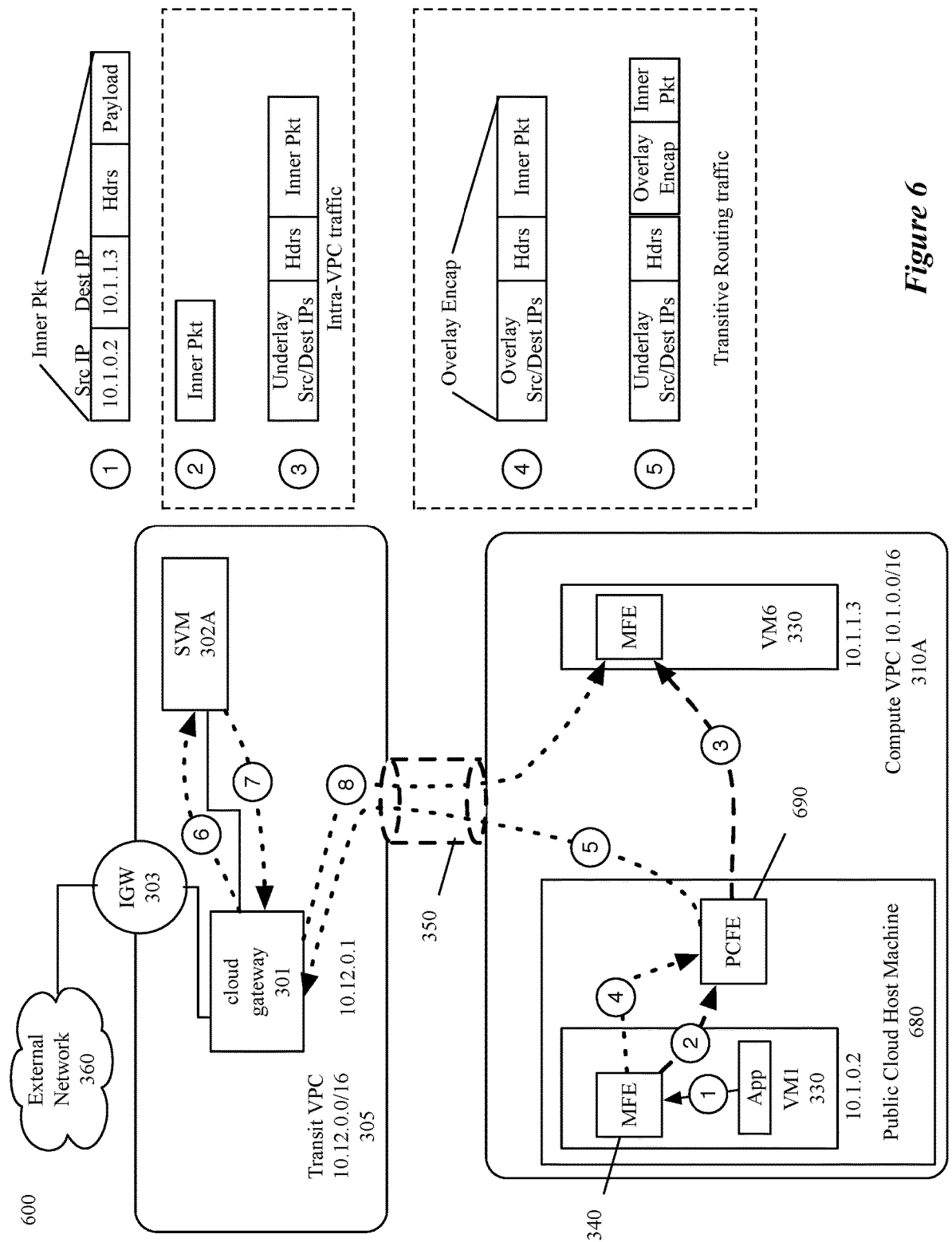
FIG. 6 illustrates a set of possible data message paths and headers that are used in some embodiments for intra-VPC traffic.

FIG. 6 illustrates a set of possible data message paths and headers that are used in some embodiments for intra-VPC traffic. FIG. 6 depicts system 600 which is a reduced view of system 300 that includes a physical cloud host machine 680 including a public cloud forwarding element (PCFE) 690 on which VM1 executes and does not show tunneling relationships between MFEs 340 and cloud gateway 301. Similar public cloud host machines 680 on which other VMs execute are not shown. FIG. 6 illustrates a data message being directed from an application executing on VM1 to VM6. As depicted, VM1 belongs to the 10.1.0.0/24 subnet of a first logical switch and VM belongs to the 10.1.1.0/24 subnet of a second logical switch, both logical switches implemented in VPC 310A with assigned IP subnet 10.1.0.0/16.

For intra-VPC traffic, first and second paths from VM1 to VM6 are depicted. The beginning of each path begins with a data message (labeled '1') that is sent from the workload application using the source and destination IP addresses that are equivalent in the overlay network and the cloud provider network. In some embodiments using different overlay network IP addresses, the overlay network addresses would appear in the header of the data message from the workload application. In embodiments using containers, the container sends data message '1' to an MFE (e.g. an OVS) using the IP addresses assigned by the overlay network. As described in relation to FIG. 5, MFE 340 determines whether the data message requires forwarding to the cloud gateway 301 (e.g., based on PBR, or lack of routing entry for the destination switch subnet as described above). If MFE 340 determines that the data message should be forwarded directly to the destination (i.e., VM6) the MFE forwards the data message to the PCFE that is provided by the cloud provider and implements the provider logical network on the underlay network infrastructure. The data message is forwarded without encapsulation by the MFE as data message '2' and the PCFE encapsulates the data message as data message '3' to traverse the underlay network to reach the public cloud host machine (not shown) hosting the destination compute node (i.e., VM6).

For intra-VPC traffic that the MFE determines requires forwarding to the cloud gateway 301 based on a need for a particular service provided by the cloud gateway 301, the MFE encapsulates the data message (as data message '4') with the IP address of the cloud gateway (e.g., 10.12.0.1) which is accessible based on the peering 350 between compute VPC 310A and transit VPC 305. The address of the cloud gateway 301, in this case, is both the overlay and cloud provider address, but in embodiments in which they are not the same, the MFE uses the VTEP address of the MFE to which the cloud gateway 301 attaches in the encapsulation. Data message '4' is received by PCFE 690 and, similarly to data message '3', is encapsulated as data message '5' to traverse the underlay network to arrive at cloud gateway 301. The structure of the data messages '1' through '5' is shown on the right hand side of FIG. 6.

Once the cloud gateway 301 receives data message '5' it provides the service (e.g., firewall, NAT, load balancing, etc.) to/for the data message. In some embodiments providing the service includes forwarding the data message as data message '6' to a service compute node (i.e., SVM 302A) that is one of a logical network service appliance or a third-party service appliance in some embodiments. Forwarding the data message to the service appliance uses the overlay encapsulation in some embodiments, while in other embodiments, the service appliance is addressed using the cloud provider logical network address. After the service is performed/provided, the service appliance returns data message '7' to the cloud gateway 301 for forwarding to the destination as data message '8'. Data message '8' in some embodiments is sent without an overlay encapsulation based on the peering relationship between transit VPC 305 and compute VPC 310A that allows addressing compute nodes in other VPCs directly. A PCFE executing on the host machine on which the cloud gateway operates will encapsulate the data message as in data messages '3' and '5' whether the data message is sent by the cloud gateway 301 encapsulated or unencapsulated. In some embodiments, data messages '6' and '7' are not sent as the service is provided by the cloud gateway itself.

Figure 7:
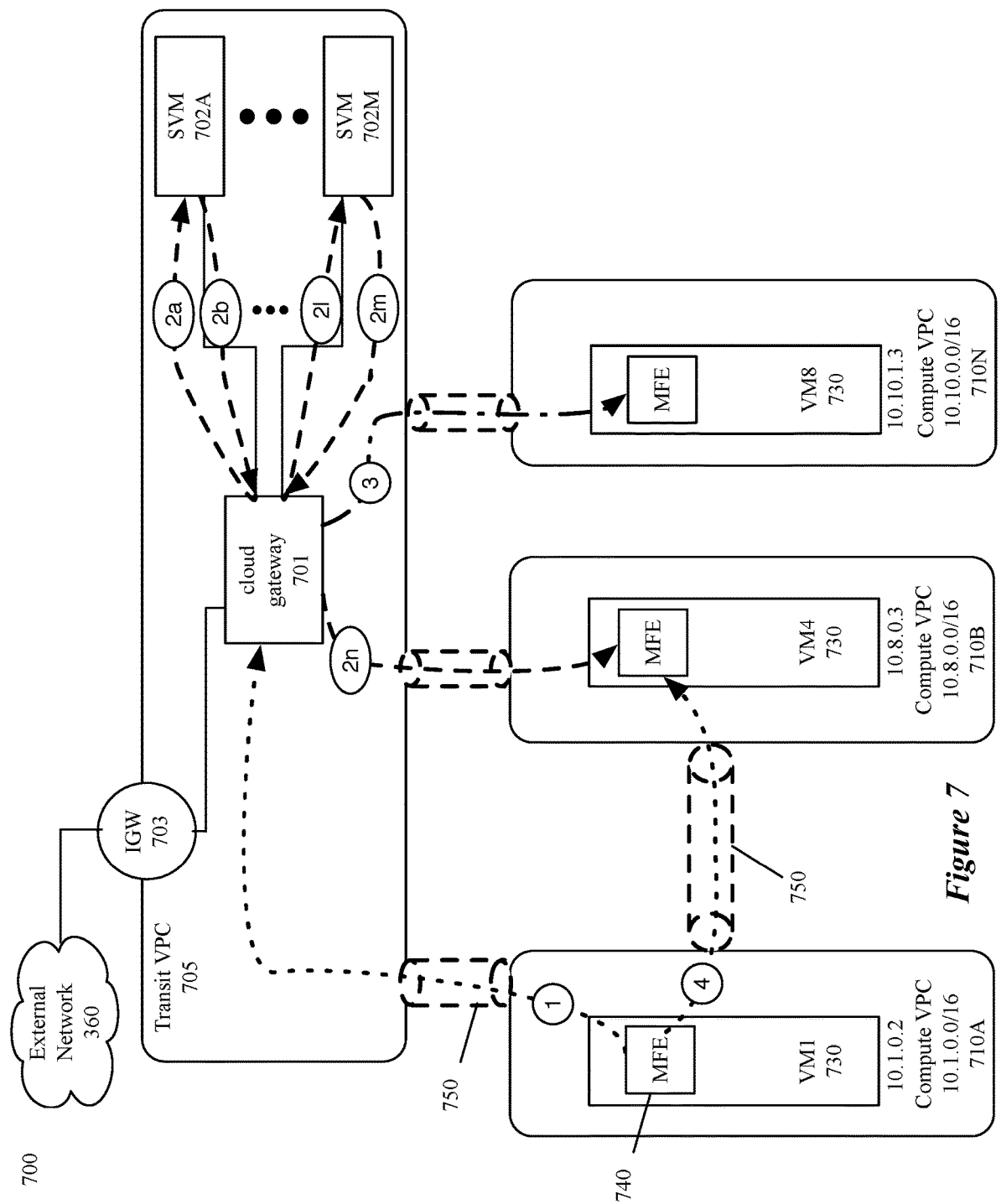
FIG. 7 illustrates a set of inter-VPC data message traffic in a system of some embodiments.

FIG. 7 illustrates a set of inter-VPC data message traffic in a system 700. System 700 depicts three compute VPCs 710A, B, and N with respective IP subnets (e.g., CIDR blocks) 10.1.0.0/16, 10.8.0.0/16, and 10.10.0.0/16, and including VMs 1, 4, and 8 with respective IP addresses 10.1.0.2, 10.8.0.3, and 10.10.1.3 (VMs 1, 4, and 8 logically connected as in FIG. 1). Each of VMs 1, 4, and 8, in some embodiments, operate in a public cloud host machine that includes a PCFE as in FIG. 6 which are not shown for clarity. Three basic inter-VPC traffic patterns are depicted in FIG. 7, (1) inter-VPC traffic through a transit VPC providing a service, (2) inter-VPC traffic using a peering between compute VPCs, and (3) inter-VPC using a transit VPC in the absence of a peering between source and destination compute VPCs.

Data message '1' of FIG. 7 depicts a first data message that has been determined to require a service provided by or through cloud gateway 701. Data message '1' is sent from an application or container on VM1 addressed to an IP address in another VPC. Upon determining that the data message requires forwarding to cloud gateway 701 (e.g., because no peering exists between source and destination VPCs (as for data message '3') or because a service is required (either data message '2n' or '3')), the MFE encapsulates the data message as in data message '4' of FIG. 6 using the VTEP IP address associated with cloud gateway 701 and forwards the data message to a PCFE which further encapsulates the data message as in data message '5' of FIG. 6 and forwards the data message to cloud gateway 701. Data messages '2a' through '2m' represent a set of data messages to implement service chaining of multiple services provided by cloud gateway 701. The service chain, in some embodiments, is in addition to services provided by the cloud gateway. In some embodiments, no services provided by the service appliances 702 are necessary and the traffic goes directly from data message '1' to data message '2n' or '3'. As discussed above, data messages sent from cloud gateway 701 to VMs in compute VPCs, such as data message '2n', can be sent using overlay encapsulation or the cloud provider network.

Data message '4' is a data message sent from a VM in a first compute VPC 710A to a second compute VPC 710B for which a peering exists. MFE 740 receives a data message from an application or container on VM1 and determines that the data message does not require routing through the transit VPC 705 and that a peering relationship exists between the current compute VPC and the destination compute VPC. Based on the determination, data message '4' is sent to the PCFE (not shown) using the cloud provider addresses (e.g., as for data message '2' of FIG. 6) for the PCFE to encapsulate using the underlay network IP addresses and headers.

Figure 8:
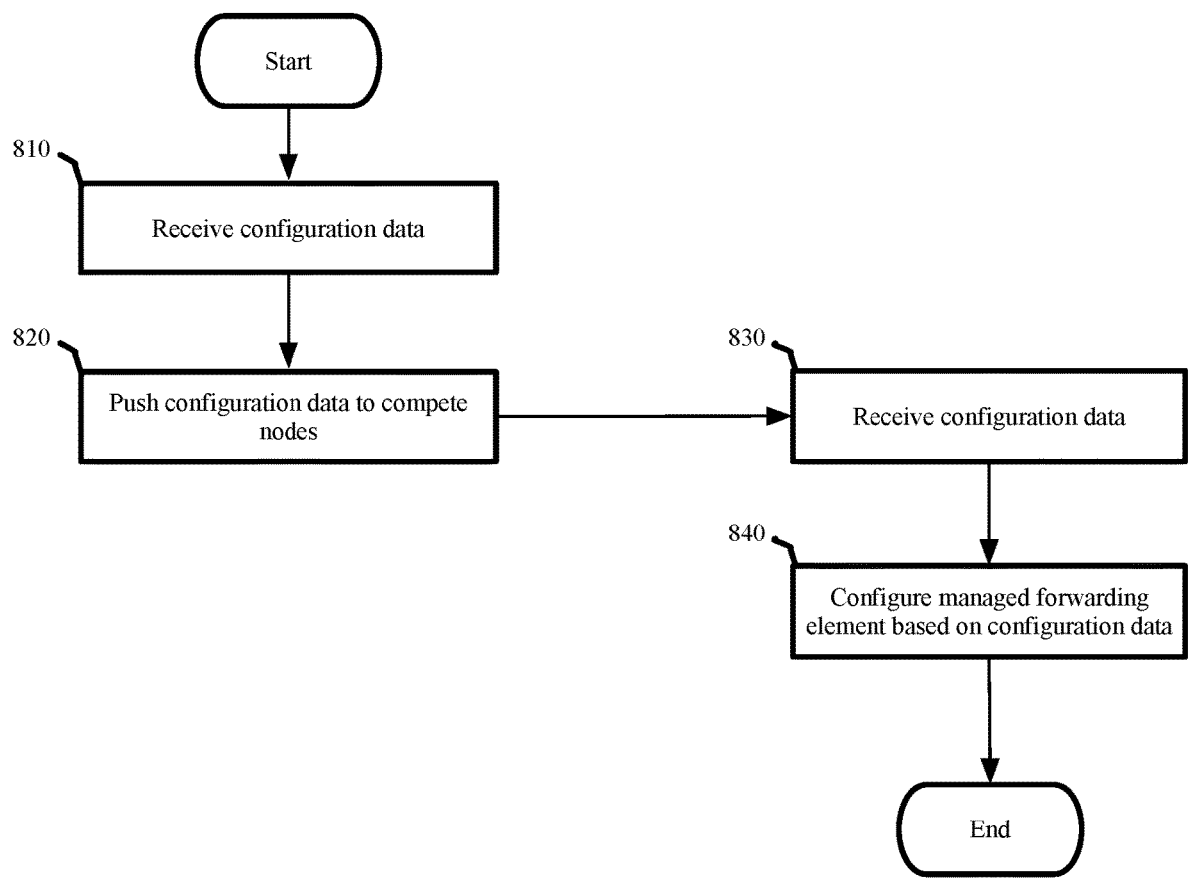
FIG. 8 conceptually illustrates a process used in some embodiments to configure an MFE to implement the process of FIG. 5.

FIG. 8 conceptually illustrates a process 800 used in some embodiments to configure an MFE to implement the process of FIG. 5. The process 800 receives (at 810) configuration data. In some embodiments, the configuration data includes a list of directly available endpoint addresses. In some embodiments, the directly available addresses are specified for a particular VPC. In other embodiments, a list specifies addresses directly available for multiple VPCs at the same time. For a list of directly available addresses for multiple VPCs, the list may be arranged as a list of addresses and the VPC for which they are directly available. Directly available addresses for a particular VPC, in some embodiments, include addresses available on VPCs peered to the particular VPC and addresses available through a cloud-provider virtual private network (VPN). Configuration data, in some embodiments, includes an identification of (1) peered VPCs and (2) VPNs that exist between VPCs. In some embodiments, the configuration data is received by a network controller from a user (e.g., a system administrator). An identification of peered VPCs and existing VPNs in some embodiments are retrieved automatically using application programming interfaces (APIs) provided by the cloud provider. Configuration data, in some embodiments, specifies a preferred method of communication between specific compute nodes or types of compute nodes (e.g., web servers to app servers, app servers to database servers, etc.) or a priority of methods of communication (e.g., preferring VPC peering using the provider network over VPN traffic) for compute nodes that are connected in multiple ways.

Once configuration data has been received (at 810) the process pushes (at 820) configuration data to compute nodes in the overlay network. In some embodiments, the configuration data pushed to the compute nodes is the configuration data received by the controller. In some embodiments, the controller converts the received configuration data into compute-node- or VPC-specific data that reflects the portion of the configuration data that is relevant to the compute node or to the VPC in which the compute node executes (e.g., that the VPC is peered with 2 additional VPCs). In some embodiments, the controller communicates the configuration information to a local agent of the compute node to be configured. This configuration data, in some embodiments, is in addition to other sets of configuration data for constructing/populating routing tables of the different MFEs.

Once the configuration information is pushed (at 820) to the compute node, the compute node receives (at 830) the configuration data. In some embodiments, the compute node operates an MFE of the overlay network. The MFE, in some embodiments, executes in a virtual machine along with a set of applications or containers for which the MFE provides forwarding services. In some embodiments, the MFE is an open vSwitch (OVS) and the configuration data is received as a set of forwarding entries for an open vSwitch (OVS). In some embodiments in which the MFE includes a routing table, the configuration includes a set of routing entries reflecting the existence of peering relationships between VPCs, the existence of VPNs, or specific flows that should be directed to a cloud gateway in a transit VPC.

In some embodiments, instead of a single MFE there is a set of managed switching and routing elements that process data messages to and from sources of data messages. The configuration data in such embodiments includes configuration data for each managed switching and routing element separately to implement the desired logical switching and routing elements, respectively, of the overlay network (e.g., a tenant logical network). In some embodiments, the compute node only executes a managed switching element with a managed routing element executing on a separate compute node.

Some embodiments place the routing entries in a routing table of a Tier-1 or Tier-0 distributed router implemented by the MFE or managed routing element. The logical network implementing Tier-1 and Tier-0 logical routers is described in U.S. Pat. No. 9,787,605 which is hereby incorporated by reference. In embodiments in which configuration data is not converted by the controller from which it is received, the compute node converts the configuration data into forwarding data (e.g., entries in a routing table, flow entries for the OVS). Some embodiments receive the configuration data as (1) policy based routing data that defines policies based on data message or flow characteristics (e.g., a five-tuple, or other header values) and (2) private routing table data that is used (i) to direct an MFE to use the private routing table when the characteristics of a data message match and (ii) to generate and populate the private routing table, respectively.

After receiving (at 830) the configuration data, the process configures (at 840) the MFE to implement the forwarding decisions based on the received configuration data. In some embodiments, configuring the MFE includes updating a routing table of the MFE (or managed routing element) with routes based on the configuration data. Routing table entries of the updated routing table may include routing entries to forward traffic (1) using the cloud provider network (e.g., sending the traffic without encapsulation by the MFE) to a destination compute node, (2) encapsulated by the MFE to use a direct tunnel between source and destination compute nodes (e.g., between MFEs to which the source and destination compute nodes connect), or (3) encapsulated to use a tunnel to a cloud gateway (e.g., a cloud gateway in a transit VPC) for the cloud gateway to forward to the destination compute node. In some embodiments, configuring the MFE includes updating flow entries of the OVS to forward traffic in any of the ways outlined above for the routing entries. The MFE is now configured and the process ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
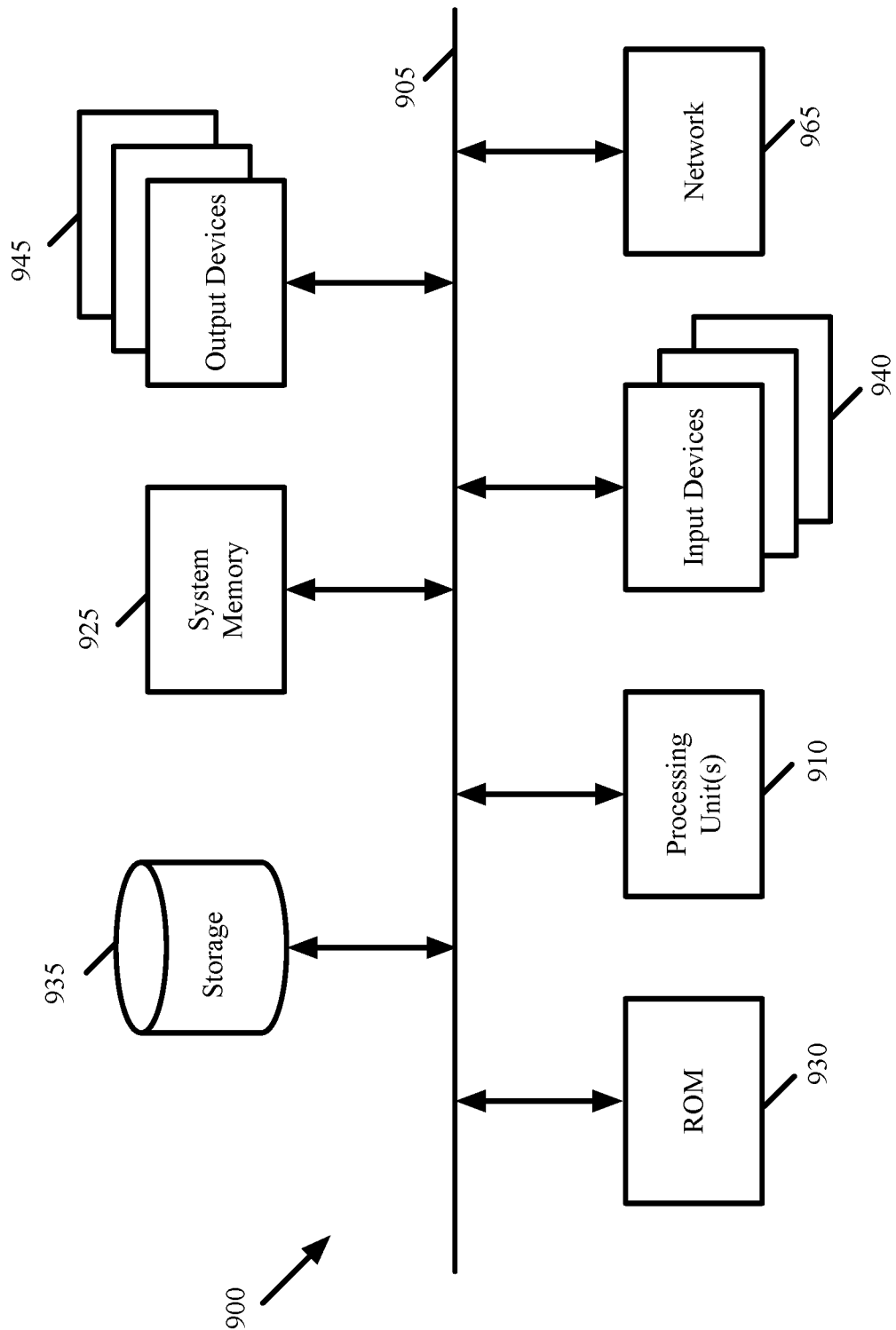
FIG. 9 conceptually illustrates a computer system with which some embodiments of the invention are implemented.

FIG. 9 conceptually illustrates a computer system 900 with which some embodiments of the invention are implemented. The computer system 900 can be used to implement any of the above-described hosts, controllers, and managers. As such, it can be used to execute any of the above described processes. This computer system includes various types of non-transitory machine readable media and interfaces for various other types of machine readable media. Computer system 900 includes a bus 9105, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the computer system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments. The read-only-memory (ROM) 930 stores static data and instructions that are needed by the processing unit(s) 910 and other modules of the computer system. The permanent storage device 935, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the computer system. The input devices 940 include alphanumeric keyboards and pointing devices (also called "cursor control devices"). The output devices 945 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples computer system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of computer system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of processing a data message at a first virtual private cloud (VPC) defined in a public cloud, the method comprising:
   at a transit gateway device executing in the transit, first VPC:
      receiving the data message from a source machine in a second VPC defined in the public cloud for a first tenant;
      performing a service operation on the data message by (i) forwarding the data message to a set of one or more service appliances in the public cloud to perform a set of one or more network services, and (ii) receiving the data message from the set of service appliances after the set of network services has been performed; and
      forwarding the data message to a destination machine outside of the first and second VPCs.

2. The method of claim 1, wherein the destination machine is in a third VPC defined in the public cloud.

3. The method of claim 2, wherein the first, second and third VPCs have first, second and third virtual networks that are isolated from each other.

4. The method of claim 1, wherein the data message is received from a managed forwarding element (MFE) that is in the public cloud and implements a logical forwarding element for the second VPC.

5. The method of claim 1, wherein the set of service appliances comprises at least one third party service appliance.

6. The method of claim 1, wherein the set of network services comprise at least one of a network address translation, a firewall service, a load balancing service, and an intrusion detection service.

7. The method of claim 1, wherein receiving the data message comprises receiving an encapsulated data message with an encapsulating header that identifies a tunnel endpoint associated with the gateway device.

8. The method of claim 1, wherein the gateway device of the first VPC is configured to forward data messages between a set of two or more VPCs that are defined in the public cloud and that are not configured to directly communicate with each other.

9. The method of claim 8, when two VPCs are not peered, one or more security rules prevent the private network addresses of one VPC from communicating with the private network addresses of the other VPC.

10. A non-transitory machine readable medium storing a transit gateway program for execution by at least one processing unit to process a data message at a first virtual private cloud (VPC) defined in a public cloud, the program comprising sets of instructions for:
   receiving the data message from a source machine in a second VPC defined in the public cloud for a first tenant;
   performing a middlebox service operation on the data message by (i) forwarding the data message to a set of one or more service appliances in the public cloud to perform a set of one or more network services, and (ii) receiving the data message from the set of service appliances after the set of network services has been performed, said middlebox service operation comprising at least one of a network address translation, a firewall service, a load balancing service, and an intrusion detection service; and
   forwarding the data message to a destination machine outside of the first and second VPCs, wherein the first and second VPCs are defined over compute nodes of a set of one or more public cloud datacenters of a public cloud provider.

11. The non-transitory machine readable medium of claim 10, wherein the destination machine is in a third VPC defined in the public cloud.

12. The non-transitory machine readable medium of claim 11, wherein the first, second and third VPCs have first, second and third virtual networks that are isolated from each other.

13. The non-transitory machine readable medium of claim 10, wherein the data message is received from a managed forwarding element (MFE) that is in the public cloud and implements a logical forwarding element for the second VPC.

14. The non-transitory machine readable medium of claim 10, wherein the set of service appliances comprises at least one third party service appliance.

15. The non-transitory machine readable medium of claim 10, wherein the set of instructions for receiving the data message comprises a set of instructions for receiving an encapsulated data message with an encapsulating header that identifies a tunnel endpoint associated with the gateway device.

16. The non-transitory machine readable medium of claim 10, wherein the gateway device of the first VPC is configured to forward data messages between a set of two or more VPCs that are defined in the public cloud and that are not configured to directly communicate with each other.

17. The non-transitory machine readable medium of claim 16, when two VPCs are not peered, one or more security rules prevent the private network addresses of one VPC from communicating with the private network addresses of the other VPC.

* * * * *